United States Patent [19]
Brett

[11] Patent Number: 5,446,899
[45] Date of Patent: Aug. 29, 1995

[54] HINT GENERATION IN SMART RECOMPILATION

[75] Inventor: Bevin R. Brett, Merrimack, N.H.

[73] Assignee: Digital Equipment Corporation, Maynard, Mass.

[21] Appl. No.: 906,212

[22] Filed: Jun. 26, 1992

[51] Int. Cl.⁶ .............................................. G06F 9/45
[52] U.S. Cl. ................................ 395/700; 364/973; 364/280.4
[58] Field of Search ............................ 395/700, 500

[56] References Cited

U.S. PATENT DOCUMENTS

| | | | |
|---|---|---|---|
| 4,558,413 | 12/1985 | Schmidt et al. | 395/600 |
| 4,667,290 | 5/1987 | Goss et al. | 364/300 |
| 5,123,098 | 6/1992 | Gunning et al. | 395/400 |
| 5,175,856 | 12/1992 | Van Dyke et al. | 395/700 |
| 5,187,788 | 2/1993 | Marmelstein | 395/700 |
| 5,193,180 | 3/1993 | Hastings | 395/575 |
| 5,201,050 | 4/1993 | McKeeman et al. | 395/700 |
| 5,204,939 | 4/1993 | Yamazaki et al. | 395/51 |
| 5,204,960 | 4/1993 | Smith | 395/700 |
| 5,206,951 | 4/1993 | Khoyi et al. | 395/650 |
| 5,230,050 | 7/1993 | Iitsuka | 395/700 |
| 5,247,651 | 9/1993 | Clarisse | 395/500 |

OTHER PUBLICATIONS

Kiong et al., "Incremental Semantic Evaluation in Language-based Editors"; Software–Practice & Experience vol. 22 No. 2, Feb. 1992, Chichester, GB, pp. 111-135.

Olsson et al., "A Simple Technique for Automatic Recompilation in Modular Programming Languages"; Software–Practice & Experience vol. 19 No. 8, Aug. 1989, Chichester, GB, pp. 757-773.

Yang, "Identifying Syntactic Differences Between Two Programs"; Software–Practice & Experience vol. 21 No. 7, Jul. 1991, Chichester, GB, pp. 739-755.

Tichy, "Smart Recompilation," ACM Transactions on Programming Languages and Systems, vol. 8, No. 3, Jul. 1986, pp. 273-291.

deFigueiredo, "A Smart Recompilation Scheme in a CHILL Compiler," *CHILL CCITT High Level Language, A Palma (Editor), Elsevier Science Publishers B. V. (North-Holland), pp. 37-41, 1991.*

Eidnes et al., "Separate Compilation in CHIPSY," Association for Computing Machinery (ACM), Document No. 089791-334-5/89/0010/0042.

Kazerooni-Zand et al., "Minimizing Ripple Recompilation in a Persistent Software Environment," Association for Computing Machinery (ACM), Document No. 089791-348-5/90/0002/0166, pp. 166-172, 1990.

Rain, "The Structure of the MARY/2 Compiler," Software—Practice and Experience, vol. 11, pp. 225-235, 1981.

Rain, "Avoiding Trickle-Down Recompilation in the Mary2 Implementation," Software-Practice and Experience, vol. 14(12), pp. 1150-1157, Dec. 1984.

Hood et al., "Efficient Recompilation of Module Interfaces in a Software Development Environment," Association for Computing Machinery (ACM) Document No. 0-89791-212-8/86/0012/180, pp. 180-189, 1986.

Cooper et al., "Interprocedural Optimization: Eliminating Unnecessary Recompilation," Association for Computing Machinery (ACM) Document No. 089791-19-7-0/86/0600-0058, pp. 58-67, 1986.

Schwanke et al., "Smarter Recompilation," ACM Transactions on Programming Languages and Systems, vol. 10, No. 4, pp. 627-632, Oct. 1988.

Tichy, "Tichy's Response to R. W. Schwanke and G. E. Kaiser's 'Smarter Recompilation'," ACM Transactions on Programming Languages and Systems, vol. 10, No. 4, pp. 633-634, Oct. 1988.

*Primary Examiner*—David Y. Eng
*Attorney, Agent, or Firm*—Denis G. Maloney; Arthur W. Fisher

[57] ABSTRACT

A method and system for compiling a source program using smart recompilation. The invention allows fragments to contain "invocation specific" information, which is generated during a code generation phase of compilation. A hint generator attempts to preserve values of the invocation specific information between successive invocations of the compiler.

17 Claims, 25 Drawing Sheets

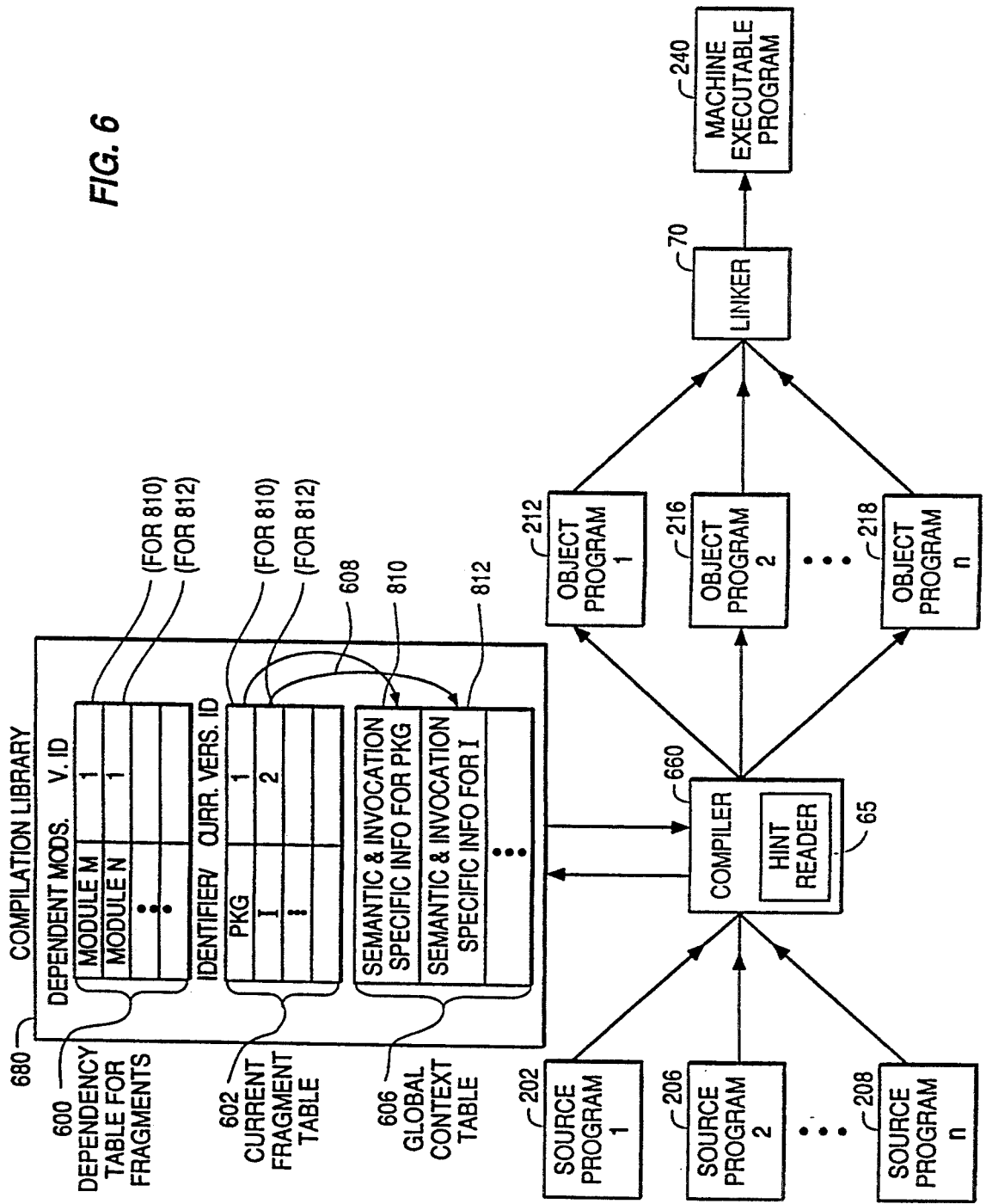

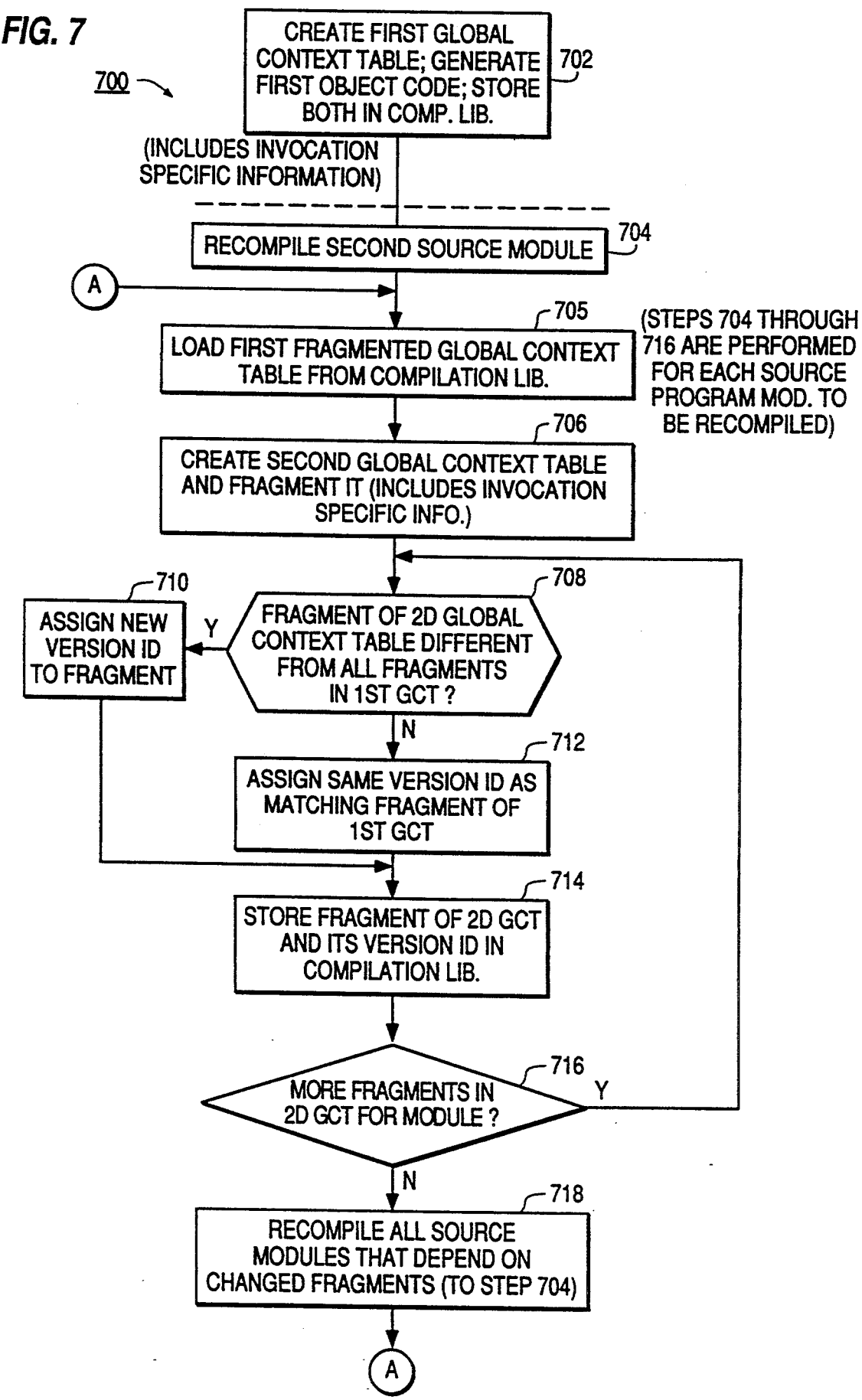

```
package PKG is

I : Integer type R is
        record
            C1 : Integer;
            C2 : Float;
        end record;
    package Inner is
        I : Integer;

end;
end;
```
800

This tree can be broken into fragments, as is shown by the dotted outlines [and numbered].

FIG. 14(a)

```
procedure example is
       V : Integer;
       C : constant Integer : = 12;
1402   procedure P(X : Integer);
       procedure P(X : Float);
       procedure Dependent_Unit is separate;
       procedure P(X : Integer) is begin V : = V+C+X; end;
       procedure P(X : Float) is begin V : = V+C+Integer(x); end;
begin
       Dependent_Unit;
end;

1404
separate (Example)
       procedure Dependent_Unit is
       begin
              P(1.0);
       end;
```

FIG. 14(b)

```
1410  Package P is
       type T is array (detbounds) of Integer
              where detbounds is a global function
```

```
00C14048:          P - K_PROC_SPEC_DECL< @#5/5:4
00C14028:            K_DECLS< @#5/5:15
00C13FEC:              X - K_OBJ_SUBP_IN< @#5/5:16
                         K_ID_BINDING<STATIC @#5/5:20                      _BINDING>
                         0000BC80:          FLOAT @STANDARD#1/10
                              VALUE     _PASS_MECH
                                1         _ARG_NUM

00C1472B:          Dependent_Unit - K_PROC_BODY_DECL< @#5/6:4
00C146D4:            K_STUB< @#5/6:32
                              DEPENDENT_UNIT           LIBR_NAME_VS
                              ADA$EXAMPLE.DEPENDENT_UNIT$     _OBJ_NAME_VS
                       00BF6354:                        _SYMTAB 00BF6954 12544340          ADA$EXAMPLE.DEPENDENT_UNIT$M, longword boundary
                           ADA specific attributes:
                                 attached        ccu         do_not_allocate
                    1510 ─── general attributes:
                                 gsd_generated
                                 cons_size    referenced  req_storg       c_label      entry
                                 globalref    constant    external        need_paren   prop_abor 00C147DC:          P - K_PROC_BODY_DECL< @#5/7:4
00C147DC:            K_DECLS< @#5/7:15
00C14780:              X - K_OBJ_SUBP_IN< @#5/7:16
                         K_ID_BINDING<STATIC @#5/7:20                      _BINDING>
                         0000BAF0: INTEGER @STANDARD#1/5
                              VALUE     _PASS_MECH
                                1         _ARG_NUM                 ─ 15021

00C14884:          P - K_PROC_BODY_DECL< @#5/8:4
00C14864:            K_DECLS< @#5/8:15
00C14828:              X - K_OBJ_SUBP_IN< @#5/8:16
                         K_ID_BINDING<STATIC @#5/8:20                      _BINDING>
                         0000BC80:          FLOAT @STANDARD#1/10
                              VALUE     _PASS_MECH           ─ 1516
                                1         _ARG_NUM
                                                      ─ 1502
00BF3A40:          K_DECLS< @#5/1:0
00BF5130: $C003 - K_OBJ_CONSTANT< @#5/0:0
                   IS_INTERNAL      _OBJ_FLAG1
```

```
1602   ⎧ compilation unit Example at line 1        ⸺1606
       ⎩      0 .. 0 = >E311E2C3  0095C46C  ⸺1604
1602   ⎧ procedure body Example at line 1          ⸺1606
       ⎩      1 .. 1 = >E311E2C3  0095C46C  ⸺1604
1602   ⎧ .. body                                   ⸺1606
       ⎩      4 .. 4 = >E311E2C3  0095C46C  ⸺1604
1602   ⎧ ... decls                                 ⸺1606
       ⎩      5 .. 5 = >E311E2C3  0095C46C  ⸺1604
       .... variable V at line 2                   ⸺16066
             6 .. 6 = >E311E2C3  0095C46C
       .... constant C at line 3                   ⸺16067
             7 .. 7 = >E311E2C3  0095C46C
1610   ⎧ .... procedure specification p at line 4
       ⎩      8 .. 10 = >E311E2C3  0095C46C
       .... procedure specification P at line 5
            11 .. 13 = >E311E2C3  0095C46C
       .... procedure body Dependent_Unit at line 6
            14 .. 14 = >E311E2C3  0095C46C
       ..... stub
            15 .. 15 = >E311E2C3  0095C46C
       .... procedure body P at line 7
            16 .. 16 = >E311E2C3  0095C46C
       ..... decls
            17 .. 17 = >E311E2C3  0095C46C
       ...... subprogram 'in' formal x at line 7
            18 .. 18 = >E311E2C3  0095C46C
       .... procedure body P at line 8
            19 .. 19 = >E311E2C3  0095C46C
       ..... decls
            20 .. 20 = >E311E2C3  0095C46C
       ...... subprogram 'in' formal x at line 8  ⸺16021
            21 .. 21 = >E311E2C3  0095C46C
       . decls
            2 .. 22 = >E311E2C3  0095C46C
1602   ⎧ .. constant $CODE at line 0               ⸺1606
       ⎩     23 .. 23 = >E311E2C3  0095C46C  ⸺1604
```

HINT GENERATION IN SMART RECOMPILATION

BACKGROUND OF THE INVENTION

This application relates to a method and apparatus for producing executable computer instructions, and particularly to a method and apparatus for producing machine-executable object code from human-readable source code using a "smart recompilation" procedure.

1. General Discussion

A computer program is a list of instructions to be performed by a processor of a computer system. FIG. 1 shows a simple computer system 100 including a memory 10, a processor 20, input output lines 30, and a bus 35, which connects memory 10 and processor 20. In addition, FIG. 1 shows a machine-executable computer program 40, a human readable computer program 50, a compiler program 60, a linker program 70, and a compilation library 80, which are stored in respective portions of memory 10. Computer program 40 is a "machine-executable" computer program. Computer program 40 contains instructions that are performed by processor 20, but that are not easily read or understood by a human being. While FIG. 1 shows that memory 10 is a memory internal to computer system 100, it should be understood that in various systems, some or all of the contents of memory 10 may also be stored on external memory devices such as magnetic tape or disks.

In order to perform (or "execute") the instructions in machine-executable computer program 40, processor 20 reads instruction in machine-executable computer program 40 from memory 10 over bus 35, and performs whatever actions are indicated by each instruction.

As described above, the machine-executable instructions in computer program 40 are written in a format that can be processed by processor 20. Computer programs stored in this format are also called "object programs," "object code," "object code programs," "object files," or "object modules." A machine-executable program includes instructions executable by the processor or data addressable by the instructions, or a combination of instructions and data. Although it is possible for a human being to write a computer program in machine-readable object code format, it is common for human beings to write computer programs in a format that is easier for human beings to read and understand. Thus, computer programs are commonly written in a "high level language," which has some resemblance to human language. Typical high level languages include COBOL, Fortran, C, and Ada. Computer programs written in a high level language are also called "source programs," "source code," "source code programs," "source modules," or "source files." Source programs are commonly translated into machine-executable programs before being executed by a computer processor, such as processor 20.

Translation of source programs to object programs is typically performed by a computer program called a "compiler," such as compiler 60 of FIG. 1. FIG. 2 is a block diagram of a conventional computer system. As shown in FIG. 2, compiler program 60 (executed by a processor not shown in the figure) inputs a source program 202, translates the source program into machine executable instructions, and outputs an object program 212 containing the machine-executable instructions. As further shown in FIG. 2, compiler 60 may perform this translation between source and object programs for a number of additional source programs 206 and 208 to produce a number of respective object programs 216 and 218.

FIG. 2 also shows linker program 70 (which also is executed by a processor not shown). The purpose of linker 70 is to combine object programs created by compiler 60 to create a single machine-executable program 240. In other words, linker 70 operates to combine multiple machine-executable programs to produce a combined machine-executable program. The linker resolves global identifiers external to and used by a program. For example, a first object program may include a definition of an identifier that is used by other object programs. Such an identifier is called a "global" identifier because it may be used in modules other than that in which it is defined. The linker generates a machine-executable program containing references to physical memory addresses corresponding to global identifiers.

While simple computer programs may be written as a single source code program, complex computer programs are usually written as multiple source code programs (called "modules") that are subsequently compiled and linked to form a single machine-executable computer program. Writing multiple source code programs has several advantages, some of which are discussed below. First, it is easier for human beings to comprehend source programs if they are organized as modules. Second, if source programs are organized as modules, it is easier for a large number of people to cooperate in writing very large computer programs. Third, if a source program is organized as modules, each module may be compiled individually. Thus, if one module of a source program is changed, it may be necessary to recompile only the changed module, and not all the other modules in the source program. This third reason becomes very important for very large computer programs involving hundreds, or thousands, of modules. Considerable time and money are saved if ways can be found to avoid recompiling every source module whenever a change is made to any one source module.

The following paragraphs discuss reasons why it is sometimes necessary to recompile many source modules when a single source module is changed. FIG. 3 shows a plurality of source code programs ("modules") having various "dependencies" upon one another. The source code modules are stored in a memory (not shown). In FIG. 3, a first source code module 300 named "ModuleA" includes a declaration of a subroutine "Sub-A" and a declaration of a subroutine "Sub-B". Subroutine Sub-A is a "global" subroutine, which means that it may be called by modules other than the module in which it is declared. A second source code module 302 named "ModuleB" includes a call to the global subroutine "Sub-A" that is included in ModuleA. ModuleB also includes a declaration of a global subroutine named "Sub-C". A third source code module 304 named "ModuleC" calls Sub-C. A fourth source code module 306 named "ModuleD" calls Sub-B of ModuleA.

Because ModuleB calls a subroutine declared in ModuleA, ModuleB is said to "depend" on ModuleA. Similarly, because ModuleC calls a subroutine declared in ModuleB, ModuleC depends on ModuleB and indirectly depends on ModuleA. Because ModuleD calls a subroutine declared in ModuleA, ModuleD also depends on ModuleA.

In some conventional systems, if changes are made to any of the contents of ModuleA, ModuleA must be recompiled. In addition, all modules which depend on ModuleA, i.e., ModuleB, ModuleC, and ModuleD, also must be recompiled whenever ModuleA is recompiled. In conventional systems, all dependent modules must be recompiled in this situation because it is not possible to determine whether a change made to ModuleA is a change that affects a dependent module. For example, if the declaration of subroutine Sub-A in ModuleA is changed, this change will not affect ModuleD. In some conventional systems, however, ModuleD must still be recompiled because it depends on ModuleA.

The contents of the changed ModuleA can be viewed as a second source program. Compiling the second source program operates to produce a second translation result, and to replace a first translation result with the second translation result.

2. Smart Recompilation

Other conventional systems have modified the dependency concept so that not all dependent modules must be recompiled when changes are made to a module, such as ModuleA. This type of compilation is called "smart recompilation". FIG. 4 shows a plurality of source modules similar to the source modules of FIG. 3. The source code modules are stored in a memory (not shown).

In FIG. 4, each source module is broken into a number of parts called "fragments". Conventional fragmentation will be discussed below in detail. Each dependent module depends on a fragment, not on an entire module. Thus, for example, ModuleB depends on a fragment 310 of ModuleA because ModuleB contains a call to Sub-A, which is declared within fragment 310. ModuleB does not depend on, for example, fragments 309 and 311 of ModuleA because ModuleB does not reference any of the contents of fragments 309 and 311. Similarly, because ModuleC calls a subroutine declared in fragment 313 of ModuleB, ModuleC depends on fragment 313 of ModuleB. ModuleD depends on fragment 311 of ModuleA, but does not depend on fragments 309 or 310.

In conventional smart recompilation systems, if changes are made to any of the contents of a fragment in, for example, ModuleA, ModuleA must be recompiled. In addition, all modules which depend on the changed fragment also must be recompiled. For example, if the declaration of subroutine Sub-A in ModuleA is changed, ModuleA will be recompiled, and ModuleB, which depends on fragment 310, also will be recompiled. Because fragment 313 does not change, ModuleC does not need to be recompiled. ModuleD, which does not depend on fragment 310, also does not need to be recompiled. Thus, in FIG. 4, fewer modules need to be recompiled when a change is made to Sub-A than when a change is made to Sub-A of FIG. 3.

FIG. 5 shows a flow chart 500 of a method used for smart recompilation in conventional systems. It should be understood that the steps of flow chart 500 and of all the flow charts discussed herein can be performed by a processor of a data processing system. The steps of flow chart 500 can be performed by, for example, processor 20 of FIG. 1 executing compiler 60 of FIG. 1.

In step 502, processor 20 creates fragments from the source program to be compiled. In conventional smart recompilation systems, the fragments are generated directly from global identifiers in the source program, where each global identifier is in a separate fragment, and the fragments do not contain any information from the code generation phase. In conventional smart recompilation systems, fragments contain only simple, semantic information, such as the names of global identifiers and their types, that is not dependent on code generation.

In step 504, processor 20 compares the newly created fragments to fragments created previously to determine which fragments reference changed global identifiers, i.e., which dependent source programs need to be recompiled. In step 506, processor 20 generates object code for the source module that needs to be recompiled.

3. The "Smart Recompilation" Problem

Each time compiler 60 is executed for a specific module is called an "invocation" of compiler 60. Information generated by the compiler that does not change between invocations (unless the source program is changed) is called "semantic" information. In conventional smart recompilation systems, fragments refer only to "semantic" information, such as global identifier names and global identifier types. This semantic information can be derived from the source program before the source program is compiled.

Conventional smart recompilation systems have several disadvantages:

1. Conventional smart recompilation systems require that the compiler produce exactly the same output when faced with the same input. This requirement ensures that fragments will match unless the source program has been changed.
2. Conventional smart recompilation systems have a negative impact on the ability of a compiler to generate optimized code because the fragments are not allowed to interact. Thus, for example, if a first module contains a declaration of a global identifier, a conventional smart compiler cannot look at modules using that global identifier when the compiler is deciding a size for the global identifier.
3. Conventional smart recompilation systems do not work well with languages that contain language constructs requiring code that is visible across module boundaries, e.g., variable length arrays, where a global array is declared to be a size which is defined in a second module.

These disadvantages, while inconvenient for a language like C, have, in the past, made recompilation impractical for a language such as Ada. Existing smart recompilation systems for the Ada language have not used a fragmentation approach. Instead, these other smart recompiling systems for Ada have employed an "incremental approach." The incremental approach exploits the whole programming environment to reduce the size of the smallest compilable construct below the file boundary, e.g., each line of a source module is treated as a separately compilable unit. Then, dependency analysis is performed on these smaller units.

Compilation of certain high level computer languages, such as Ada, tends to generate information that may change between compiler invocations even when corresponding semantic information has not changed. Such information is hereinafter called "invocation specific information."

FIG. 14(a) shows examples of an Ada language construct that make it impractical to use conventional smart recompilation techniques. FIG. 14(a) shows an example of a compilation problem known as "overloading, i.e. the situation in which multiple variables, procedures, etc. of a same scope have the same name". Source program 1402 includes a procedure named "Example".

Procedure Example includes two procedures, both named "P". A first procedure P has an integer parameter named X. A second procedure P has a floating point parameter named X. Conventional smart recompilation systems cannot compile source programs for languages that permit overloading because invocation specific information is used to access these procedures at run time.

Source program 1410 of FIG. 14(b) shows an example of certain programming language constructs that require global information to determine the size of an array. FIG. 14(b) shows a declaration of a type T, which is defined as an array whose bounds are determined at run time by a function call to the function "detbounds". In conventional smart recompilation systems, type T and function detbounds will be associated with separate fragments. In addition, a compiler would probably generate a temporary variable to hold the result of the runtime function call to the function detbounds. This temporary variable must be global, so that modules accessing the global type T can determine the bounds of arrays of type T. In conventional compilers, the location of the temporary variable is not determined until after compile time. A compiler may place this variable at different locations, depending on factors such as the size of the temporary variable, its alignment requirements, the presence of variable declarations in the source program, etc. Thus, the location of the temporary variable is not known at the time that a dependency analysis is conventionally performed. The location of the temporary variable is invocation specific.

Because a change in location of the temporary variable is not known when conventional dependency analysis is performed and because the variable location is invocation specific, it is not possible for a conventional smart recompilation system to determine when a dependency has changed.

In general, in conventional smart recompilation systems, a fragment changes only when its semantic information changes. When a compiler also generates invocation specific information, fragmentation and dependency analysis based solely on semantic information is insufficient.

A system for achieving smart recompilation by generating fragments having invocation specific information is described all length later in this application. In such a system, it is desirable to suppress changes in invocation specific information caused by a recompilation, thereby reducing the number of resulting recompilations.

ADVANTAGES AND SUMMARY OF THE INVENTION

It is an advantage of the present invention to suppress changes in invocation specific information caused by a recompilation.

To achieve this and other advantages of the present invention, according to an aspect of the present invention, in a computer system including a memory, a method of generating a machine executable program comprises the steps of translating a first program to produce a first translation result; placing the first translation result into a memory structure; translating a second program, the second program differing from the first program, to produce a second translation result in accordance with invocation specific information in the first translation result; determining whether the first translation result is substantially different from the second translation result; replacing the first translation result with the second translation result in the memory structure; and selectively retranslating a third program in response to whether the first translation result is substantially different from the second translation result.

According to another aspect of the present invention, a method of generating machine executable instructions comprises the steps of translating a first source file having a first contents to produce a first translation result in accordance with the first contents; changing the first source file to have a second contents different from the first contents; translating the first source file having the second contents to produce a second translation result in accordance with the second contents and invocation specific information in the first translation result; determining whether the first translation result is substantially different from a corresponding part of the second translation result; and selectively retranslating a second source file in response to whether the first translation result is substantially different from the second translation result.

According to another aspect of the present invention, a method of generating machine executable instructions comprises the steps of translating a first source file having a first contents to produce a first translation result in accordance with the first contents, the first translation result having a plurality of externally visible entries; changing the first source file to have a second contents different from the first contents; translating the first source file having the second contents to produce a second translation result in accordance with the second contents and invocation specific information in the first translation result, the second translation result having a plurality of externally visible entries; determining whether the first translation result is substantially different from a corresponding part of the second translation result; and selectively retranslating a second source file in response to whether the first translation result is substantially different from the second translation result. The step of translating the first source file having the second contents includes a substep of associating an entry in the second translation result with an entry in the first translation result.

Advantages of the invention will be set forth in part in the description which follows and in part will be obvious from the description or may be learned by practice of the invention. The advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 6 is a block diagram of a preferred embodiment of the present invention;

FIG. 7 is a flow chart of a preferred embodiment of the present invention;

FIG. 14(a) is an exemplary source program written in the Ada programming language;

FIG. 14(b) an exemplary source program written in the Ada programming language;

FIG. 15(b) is a continuation of FIG. 15(a);

FIG. 16 is an example of a fragment table for a fragmented Global Context Table of FIGS. 15(a) and 15(b);

DETAILED DESCRIPTION OF PREFERRED EMBODIMENTS

Various aspects of the preferred embodiments are the subject of copending U.S. application of Bevin Reginald Brett for SMART RECOMPILATION BY PERFORMING MATCHUP/DIFFERENCE AFTER CODE GENERATION, filed Jun. 26, 1992, Ser. No. 07/904,816; now U.S. Pat. No. 5,367,683; copending U.S. application of Bevin Reginald Brett for USING SORTING TO DO MATCHUP IN SMART RECOMPILATION, filed Jun. 26, 1992, Ser. No. 07/905,930, now abandoned in favor of Ser. No. 08/319,334; and copending U.S. application of Bevin Reginald Brett for USING HINT GENERATION TO CAUSE PORTIONS OF OBJECT FILES TO REMAIN THE SAME, filed Jun. 26, 1992, Ser. No. 07/905,929 now abandoned in favor of Ser. No. 08/222,560.

Reference will now be made in detail to preferred embodiments of the invention, examples of which are illustrated in the accompanying drawings. Wherever possible, the same reference numbers will be used throughout the drawings to refer to the same or like parts.

A preferred embodiment of the invention performs fragmentation after code generation and, thus, fragments of a preferred embodiment of the invention can include information from the code generation. The present fragments of a preferred embodiment are stored in a Global Context Table that is written during code generation.

A preferred embodiment of the present invention is implemented as a modification to an pre-existing Ada compiler, i.e., Digital VAX V3.0 Ada Compiler V3.0, Digital RISC Ultrix Ada Compiler, and Digital Open VMS AXP Ada Compiler, each of which is manufactured by Digital Equipment Corporation. It should be understood that the present invention could be implemented by modifying other pre-existing compilers for Ada or for other computer languages. The present invention could also be implemented, for example, by a compiler that is not based on a pre-existing compiler in accordance with the following discussion. At least "Digital," "VAX," "VMS," "Ultrix," "RISC Ultrix," "Open VMS," and "AXP" are trademarks of Digital Equipment Corporation.

Specifically, the described embodiment modifies a preexisting optimizing Ada compiler that does not perform smart recompilation so that the compiler does perform smart recompilation. Thus, an optimizing code generation portion of the existing compiler is not modified, but modifications are made so that fragmentation is performed on the Global Context Table as described below. Hint generation is used to ensure that fragments generated by successive compiler invocations are equivalent whenever possible.

Figure 1:
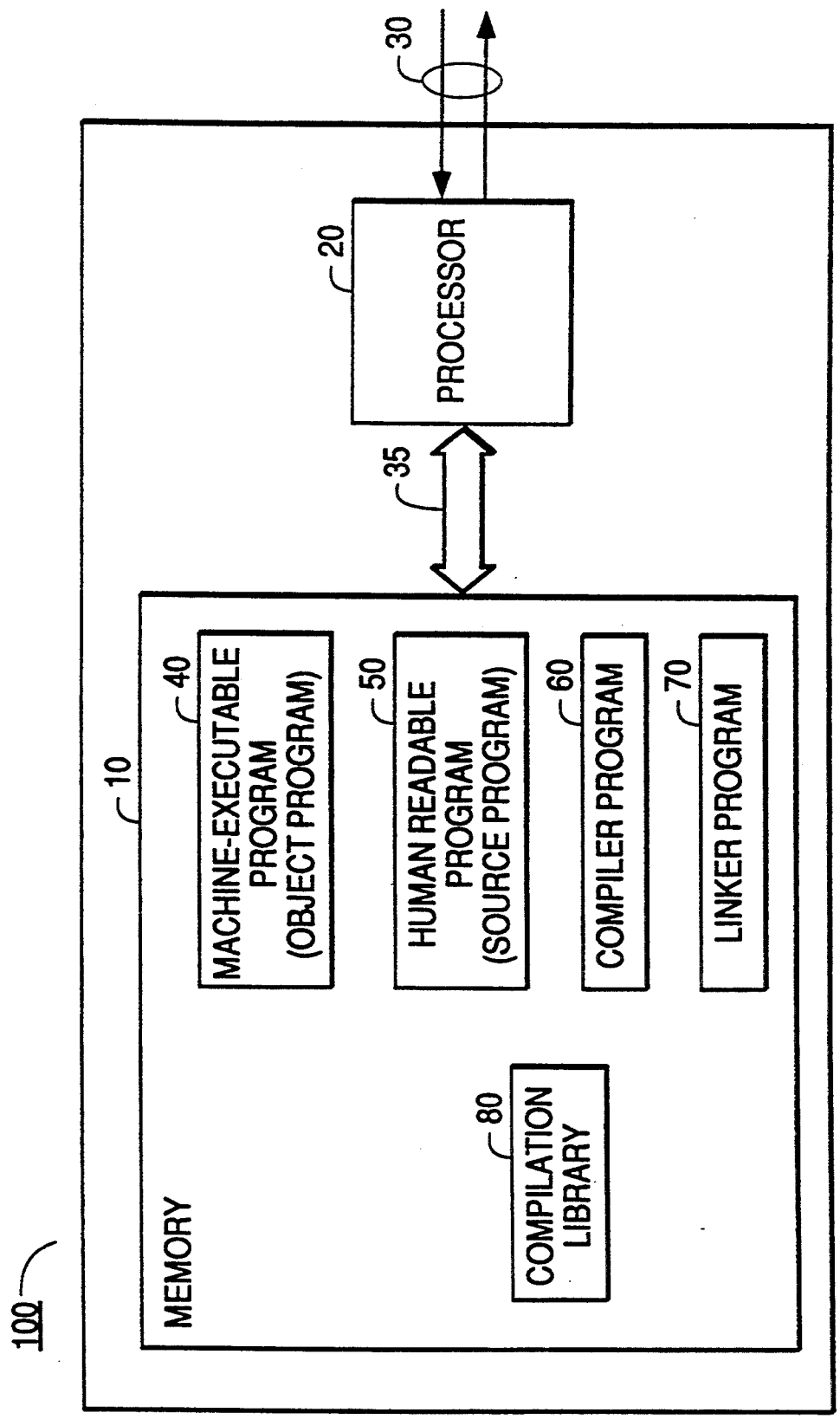
FIG. 1 is a block diagram of a computer system.
Figure 2:
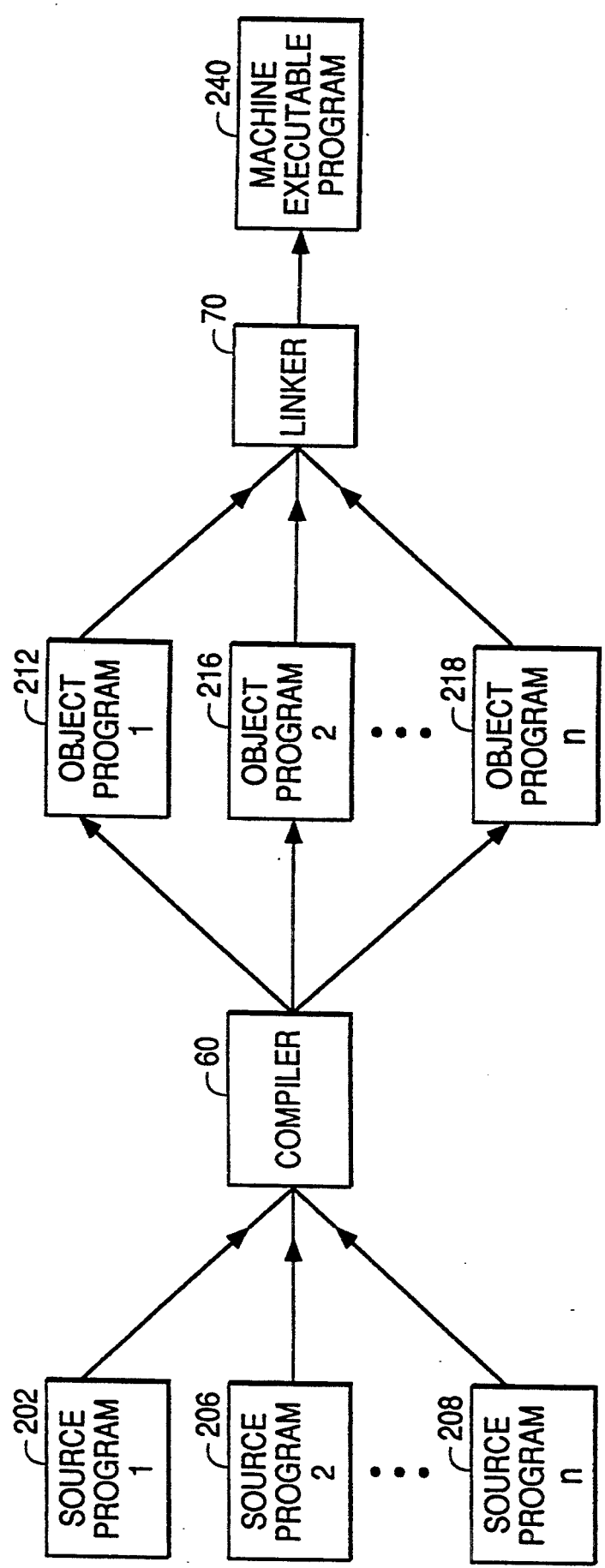
FIG. 2 is a flow diagram of a conventional compilation process.
Figure 3:
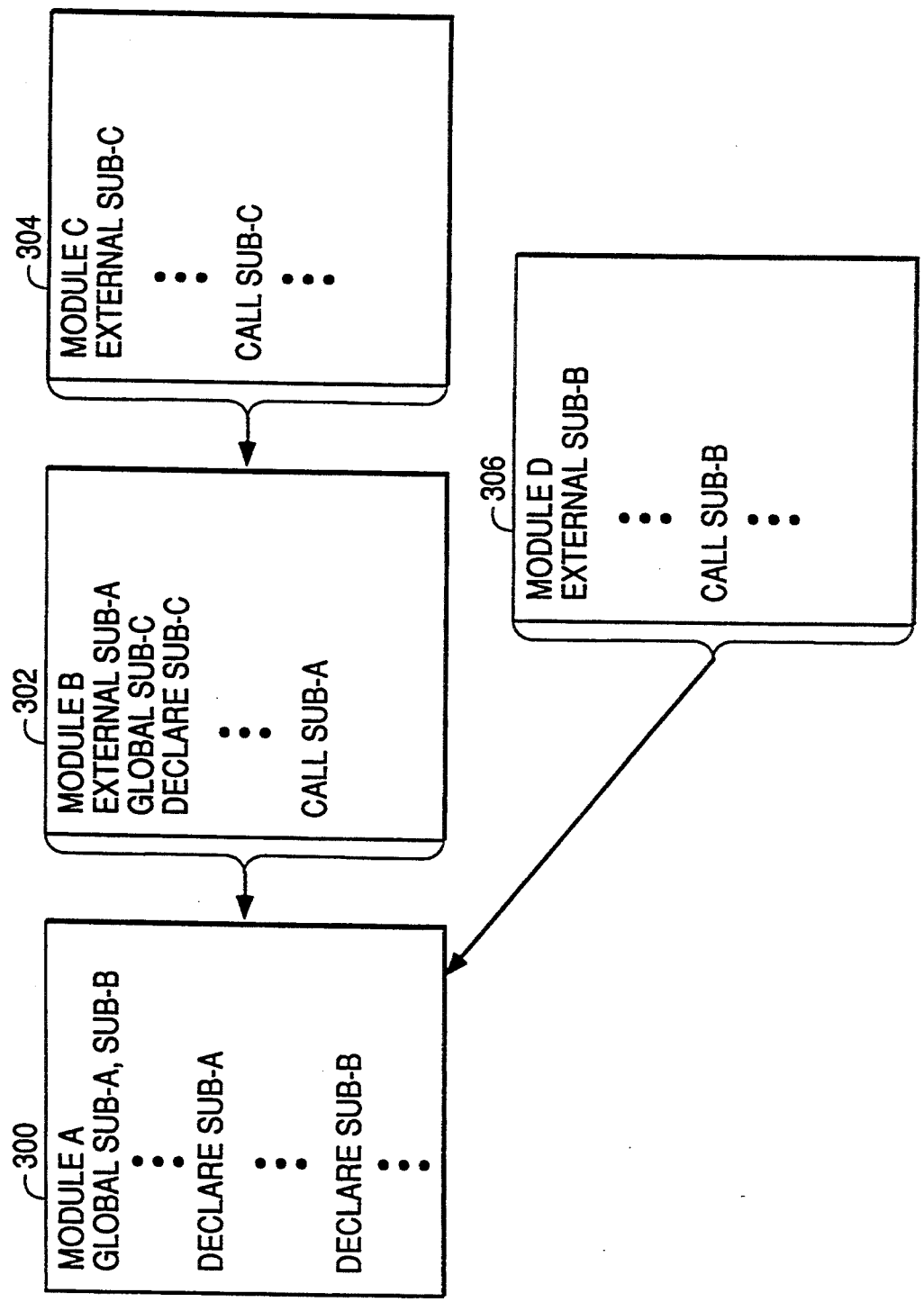
FIG. 3 is a block diagram explaining dependency for a conventional system.
Figure 4:
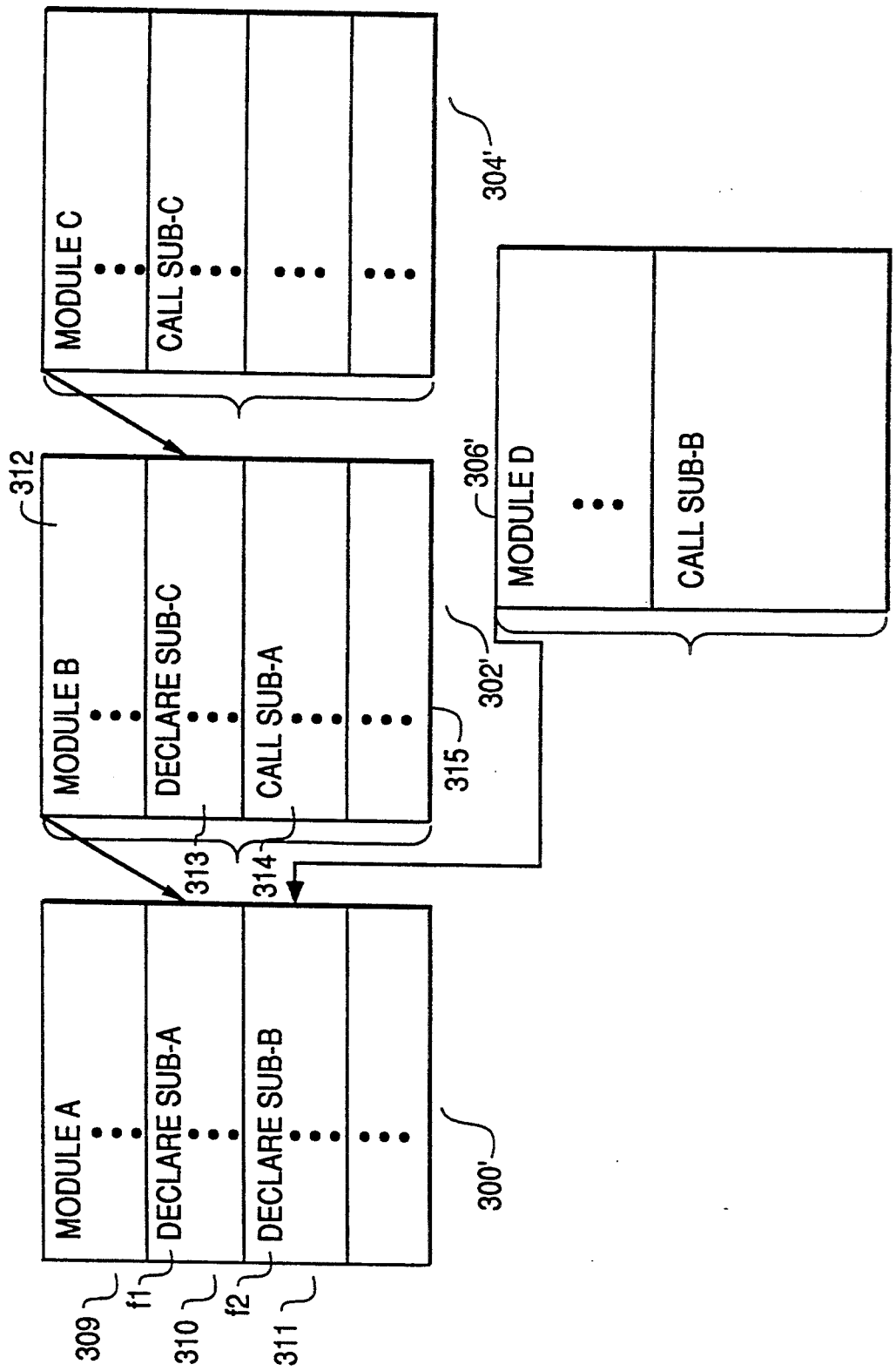
FIG. 4 is a block diagram explaining dependency for a conventional smart recompilation system.
Figure 5:
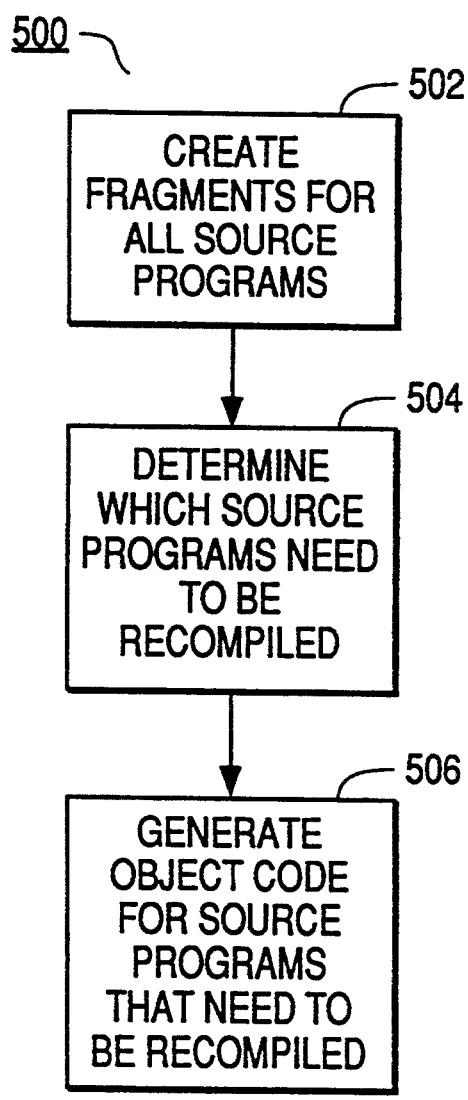
FIG. 5 is a flow chart showing a conventional smart recompilation method.

FIG. 6 is a block diagram of a preferred embodiment of the present invention for performing smart recompilation on source programs written in languages such as Ada. Certain elements of FIG. 6 correspond to elements of FIG. 2. All elements of FIG. 2 preferably are stored in a memory of a data processing system. Compiler 660 and linker 70 are executed by a processor of the data processing system. FIG. 6 shows a compilation library 680, which includes various tables as discussed below. Hint reader 65 is discussed in detail in connection with FIG. 17 below.

Compilation library 680 includes a Dependency Table 600. Dependency Table 600 includes an entry for fragments, such as fragments 810 and 812 in a Global Context Table 606. As shown in FIG. 6, a first entry of Dependency Table 600 lists all modules that depend on fragment 810, e.g., ModuleM. A second entry of Dependency Table 600 lists all modules that depend on fragment 812, e.g., ModuleN. Other dependencies of these and other fragments exist in Dependency Table 600 but are not shown for purposes of clarity.

Each entry of Dependency Table 600 also includes a version identifier ("version id"). Each time a fragment is changed so that it is no longer equivalent to the previous, pre-change, fragment, the fragment is assigned a different version id as discussed below. Dependency Table 600 contains the version id of a fragment on which the dependent module last depended. In FIG. 6, for example, both entries in Dependency Table 100 contain a version id of "1", indicating that the dependent modules were last compiled for version "1" of the respective fragments from which they depend. In a preferred embodiment, dependency table may have other formats than the format shown.

Compilation Library 680 also includes a Global Context Table 606. Global Context Table 606 contains definitions of all subroutines, variables, constants, etc. that are globally defined, i.e., that can be referenced by modules outside of the modules in which they are defined. Global Context Table 606 is written during compilation of object code. Global Context Table 606 is broken into fragments, as described below. Global Context Table 606 preferably contains both semantic information and invocation specific information. Examples of entries in Global Context Table 606 are shown in FIG. 15.

Compilation library 680 includes a Fragment Table 602. Each entry in Fragment Table 602 corresponds to a fragment of Global Context Table 606. Fragment Table 602 is generated by fragmenting Global Context Table 606 after generation of object code. Fragment Table 602 has pointers 608 into the Global Context Table 606, as described further in connection with FIGS. 15 and 16.

Most fragments directly correspond to a global identifier such as a type definition, constant definition, or functional procedure definition. Some fragments, however, correspond to other structures. For example, a fragment is created to represent all the declarations of an overloaded procedure.

For the purposes of example, a first entry of Fragment Table 602 includes a global identifier "PKG", which is the name of an entity defined in fragment 810 of FIG. 8(*b*). The entry points to an entry in the Global Context Table containing semantic and invocation specific information for PKG (pointer 608). A second entry of Fragment Table 602 includes a name I, which is the name of an entity defined in fragment 812 of FIG. 8(*b*). The entry points to an entry in the Global Context Table containing semantic and invocation specific information for I (pointer not shown). Names of various types of identifiers can appear in Fragment Table 602. Other examples of entries in Fragment Table 602 are shown in FIG. 16. Other entries in Fragment Table 602 point to fragments for global identifiers in other modules. The fragments for each module preferably are organized in the Global Context Table as a tree structure, as shown in FIG. 8(*b*).

Each entry of Fragment Table 602 also includes a version id for the fragment. Whenever a module is changed and recompiled, each fragment that is altered by the change is given a new version id, as discussed below in connection with FIG. 7. Each version id in the Fragment Table preferably is unique to the current invocation of the compiler in which the source module corresponding to the fragment was compiled. In a preferred embodiment, the version id is a word at least 64 bits long. The contents of the version id preferably is determined by a compilation starting time for source program 202 and by one or more other factors, such as a name of compilation library 680.

FIG. 6 shows a fragmentation system in accordance with a preferred embodiment of the present invention. After a ModuleQ (not shown) defining both "PKG" and "I" is changed and recompiled, if fragment 812 changes, a new version id, i.e., "2", is stored in the second entry of Fragment Table 602. If fragment 810 does not change, a new version id is not entered in the first entry of Table 602. In FIG. 6, Dependency Table 600 shows that ModuleN depends on fragment 812, and therefore ModuleN will also be recompiled and a version id of "2" will be stored in the second entry of Dependency Table 600. ModuleM, which depends on unchanged fragment 810 does not need to be recompiled and the version id in the first entry of Dependency Table 600 will not change.

Compilation Library 680 also includes a plurality of object files. These object files will be described in detail below in connection with FIG. 9. In this example, the object files include object programs 212, 216, and 218 that are input by linker 70. The object files in compilation library 680 also include other object files (not shown) generated from other source programs (not shown).

In general, compiler 660 places data areas for the variables in a section of memory separate from program sections containing instructions as described below in connection with FIG. 9. Compiler 660 may place all procedures of a source program into a common section, or may place the procedures in separate sections.

FIG. 7 is a flow chart 700 showing a method of compiling a source program in accordance with a preferred embodiment of the present invention. Step 702 is separated from the other steps of FIG. 7 by a dotted line to indicate that step 702 is performed at some time before the other steps of FIG. 7. For example, many days may elapse between the time that steps 702 and 704 are executed. Step 702 is shown herein to illustrate that tables 602 and 606 of Compilation Library 680 of FIG. 6 have been created at least once before the other steps are executed. The fragments of the first Global Context Table 606 created in step 702 are called "first fragments" for purposes of example.

In step 704, processor 20 compiles a second source program. In step 705, processor 20 loads the first fragmented Global Context Table 606 from compilation library 680 into a memory. For the purposes of example, this second source program is somewhat similar to a source program compiled in step 702 to create Global Context Table 606. The second source program may be viewed as, for example, a new, changed version of ModuleQ, discussed above. In step 706, processor 20 creates a second Global Context Table in a memory (not shown) from the second source program and fragments it. The fragmented Global Context Table is stored in a memory (not shown). These fragments are called "second fragments" for purposes of example. In step 708, processor 20 compares each of the second fragments to the first fragments in Global Context Table 606. For each second fragment, if a matching first fragment is found in Table 606, then recompilation did not affect that fragment and the version id of the first fragment (in Fragment Table 602) is used for the second fragment in step 712. For each second fragment, if no matching first fragment is found, the recompilation caused that fragment to change, and a new version id is assigned to the second fragment in step 710. The function used to determine whether two fragments match is described in FIGS. 19 and 20.

In step 714, processor 20 stores the new fragment and its assigned version id in Fragment Table 602 and Global Context Table 606. If, in step 716, processor 20 determines that all of the second fragments for the recompiled source module have been processed, processor 20 looks at Dependency Table 600 of FIG. 6 to determine whether any modules depending from the second fragments also need to be recompiled. For example, if, as discussed above, recompilation of ModuleQ causes fragment 812 to change, a new fragment id of "2" is stored in the "I" of Fragment Table 602. Dependency Table 600 indicates that ModuleN depends on fragment 812 and that ModuleN was last compiled for version "1" of fragment 812. Because fragment 812 now has a version id of "2", it is necessary to recompile ModuleN in step 718 of FIG. 7. Control then returns to step 705 where a next group of first fragments for ModuleN is loaded from the compilation library, the Global Context Table of newly recompiled ModuleN is fragmented, and the process repeats.

Thus, in a preferred embodiment of the present invention, smart recompilation is achieved by dividing a Global Context Table into fragments after object code generation, i.e., after recompilation. Whenever a fragment is changed, modules dependent on the changed fragment are also recompiled and refragmented.

Figures 8A, 8B:
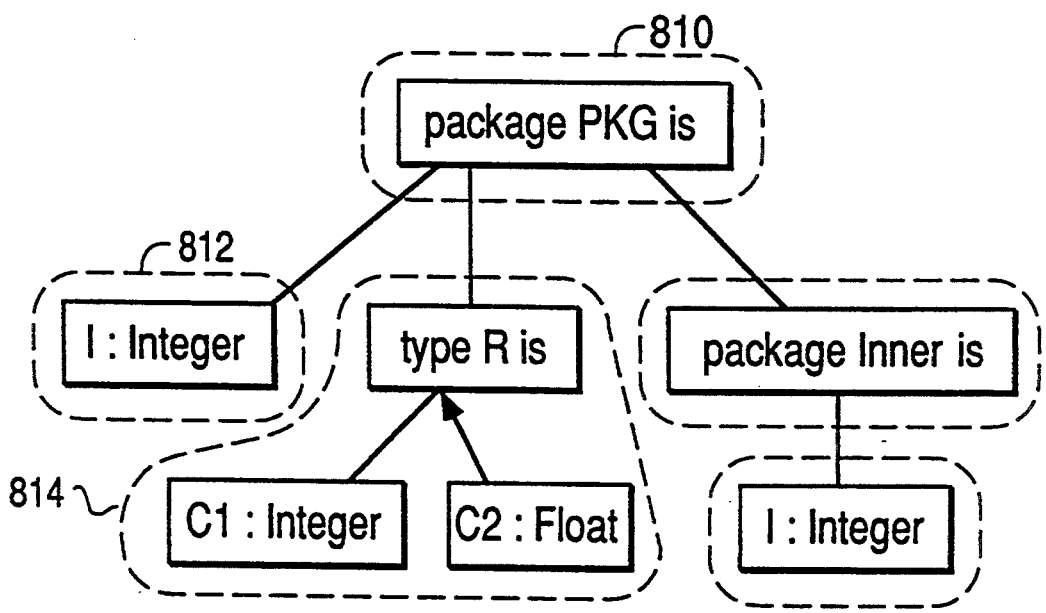
FIG. 8(a) is an exemplary source program written in the Ada programming language.
FIG. 8(b) is an example of fragmentation of the source program of FIG. 8(a)

FIGS. 8(a) and 8(b) show an example of an Ada source program and an example of how the Global Context Table of the Ada source program is broken into fragments. FIG. 8(a) shows an example of an Ada source program 800. Several global identifiers are declared in source program 800. The global identifiers include a package name PKG. All other identifiers are within the "scope" of package PKG. Other identifiers include a first integer I; a type R, which is a record containing an integer C1 and a floating point number C2; and a package Inner, which includes a second variable I. It is assumed that all identifiers of source program 800 are global identifiers.

FIG. 8(b) shows an example of how a preferred embodiment of the present invention preferably divides the Global Context Table into fragments. Not all information in the Global Context Table is shown in FIG. 8(b). The fragments in FIG. 8(b) preferably are organized into a tree structure in the Global Context Table in accordance with the scope of their declaration in source program 800. Thus, a first fragment 810 refers to Package PKG, a second fragment 812 refers to the first integer variable I, a third fragment 814 refers to type R, and so on. In a preferred embodiment, fragments usually correspond to a single complete declaration, but in the case of the fragment 814 for record R, certain embodiments may find it convenient or advantageous to include the record component declarations for C1 and C2 in the same fragment as the record declaration itself.

Figure 9:
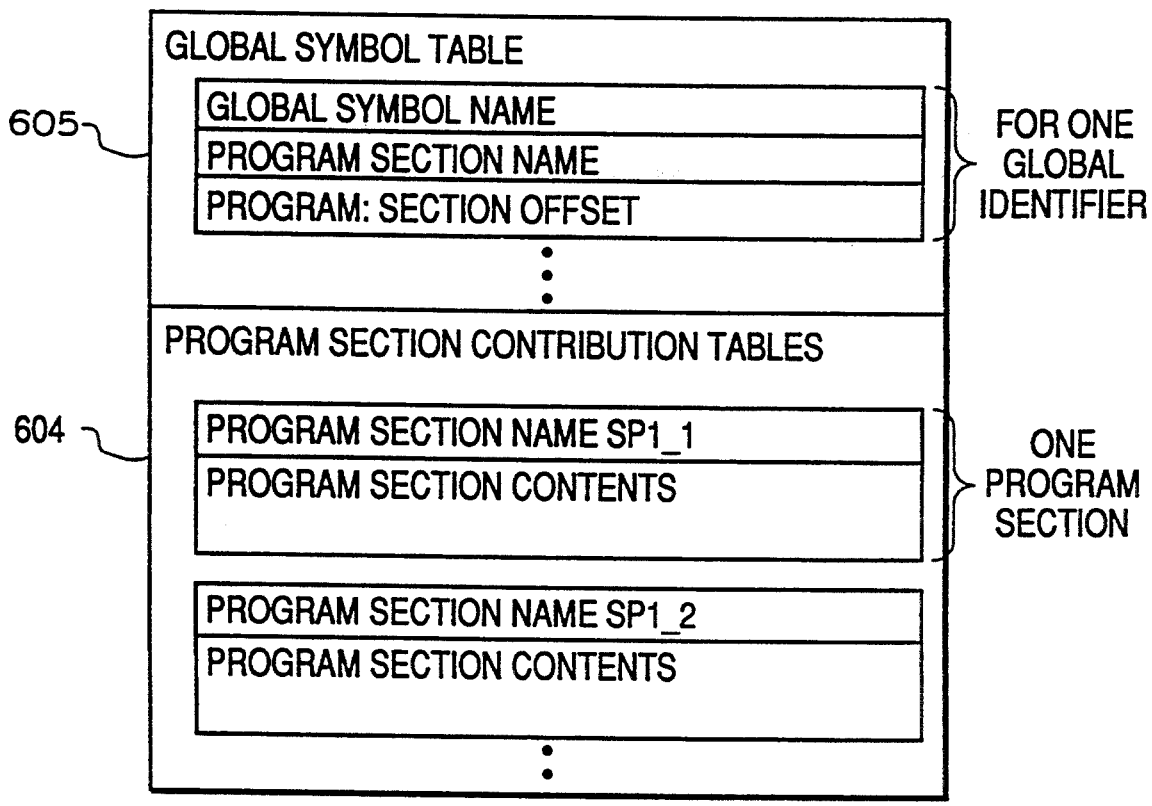
FIG. 9 is a diagram of an object file format.

FIG. 9 is a block diagram of a format of Object Files 212, 216, and 218 of FIG. 6. As shown in FIG. 9, an object file may include a global symbol table 605 and a program section (psect) contribution table 604. An entry in the global symbol table 605 for a global identifier includes the name of the identifier (global symbol name) and a location in the object code where the global identifier is defined (program section name and program section offset). Each object program includes a plurality of program sections and object code generated for that program section. The psect contribution table 604 contains information about program sections such as, for example, a program section name. Thus, for example, a global identifier is defined at a certain offset in a named program section of an object program. Examples of Global Context Table 606 and other object files are given below.

Figure 10:
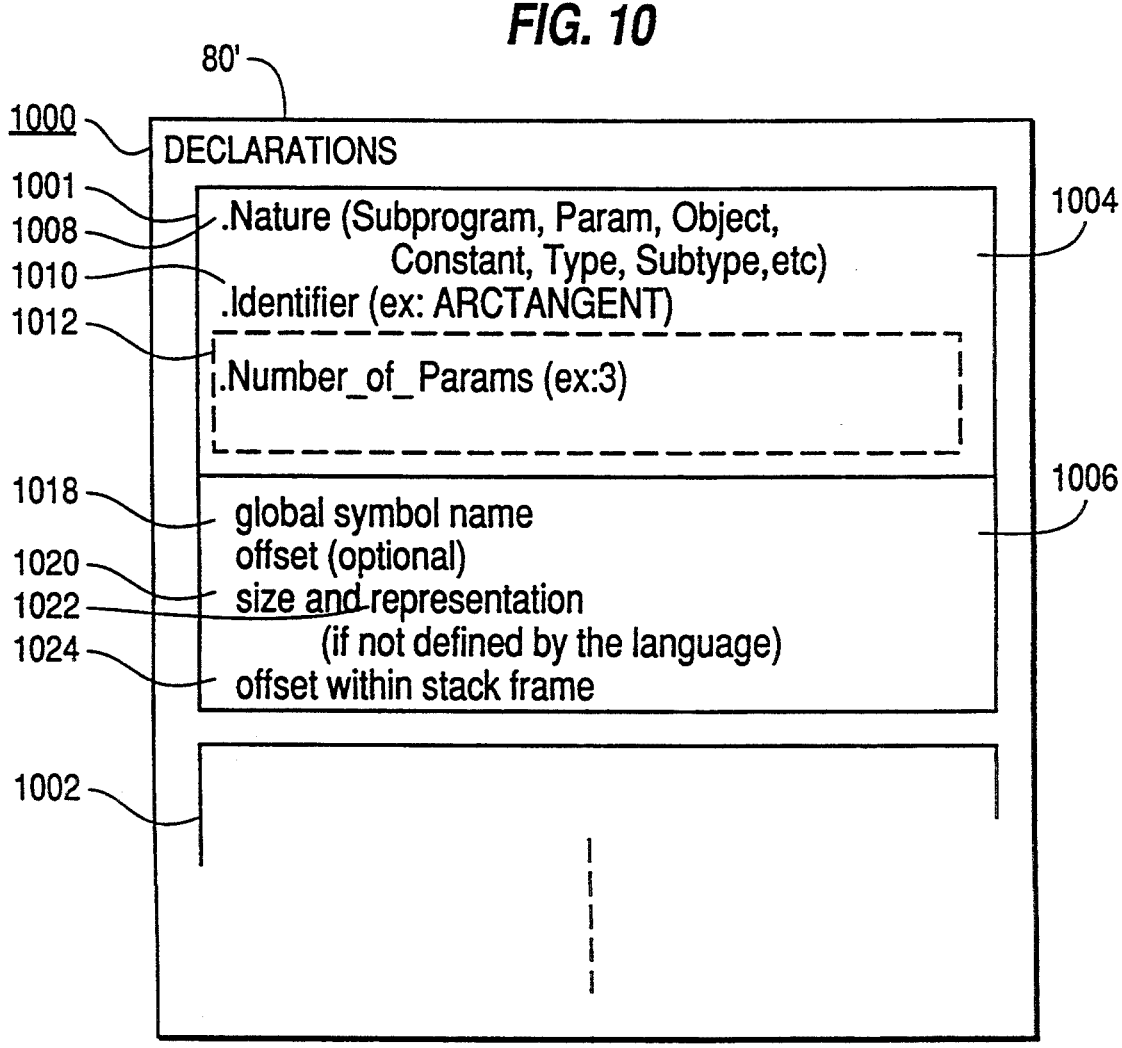
FIG. 10 is a diagram of a Global Context Table in a compilation library of FIG. 6.

FIG. 10 shows a single fragment in a global context table of a compilation unit ("source module") 1000 in compilation library 680 having a plurality of declarations, including a first declaration 1001 and second declaration 1002.

Most significantly, FIG. 10 shows invocation specific information 1006, which is stored in each declaration.

Generally, invocation specific information is information which is specific to a particular invocation of the compiler for a source module.

Each declaration is further divided into semantic information 1004 and invocation specific information 1006. The compilation unit 1000 is stored in the compilation library 680 shown in FIG. 6.

Exemplary semantic information 1004 for a first declaration shown in FIG. 10 includes a nature 1008, an identifier 1010, and other nature specific information 1012, such as the number of parameters and the type of parameters.

Exemplary invocation specific information 1006 for the first declaration includes a global symbol name 1018, a size 1020 and representation 1022 of a variable, and the offset 1024 within the stack frame of a stack-allocated variable.

Figure 11:
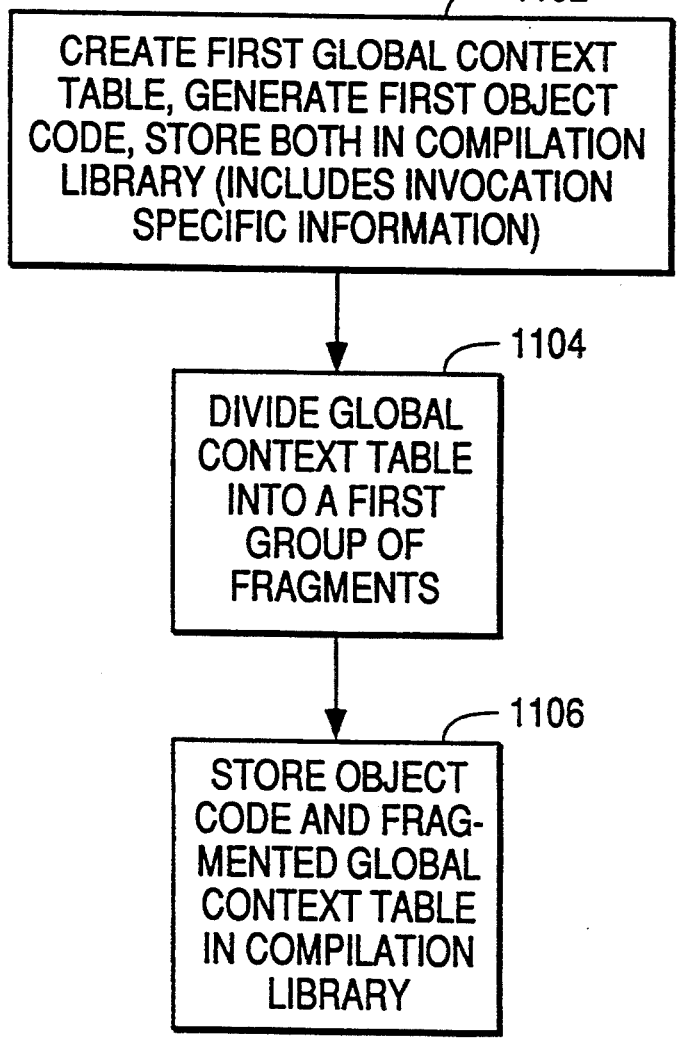
FIG. 11 is a flowchart showing further details of the flow chart of FIG. 7 for storing a first Global Context Table.

FIG. 11 is a flowchart showing further details of step 702 of the flow chart of FIG. 7 for storing a first Global Context Table. In step 1102, processor 20 creates a Global Context Table (including invocation specific information from the code generation) and generates object code. In step 1104, processor 20 divides the first global context table into a first group of fragments. The generated object code and fragmented global context table are stored in compilation library 680.

Figure 12:
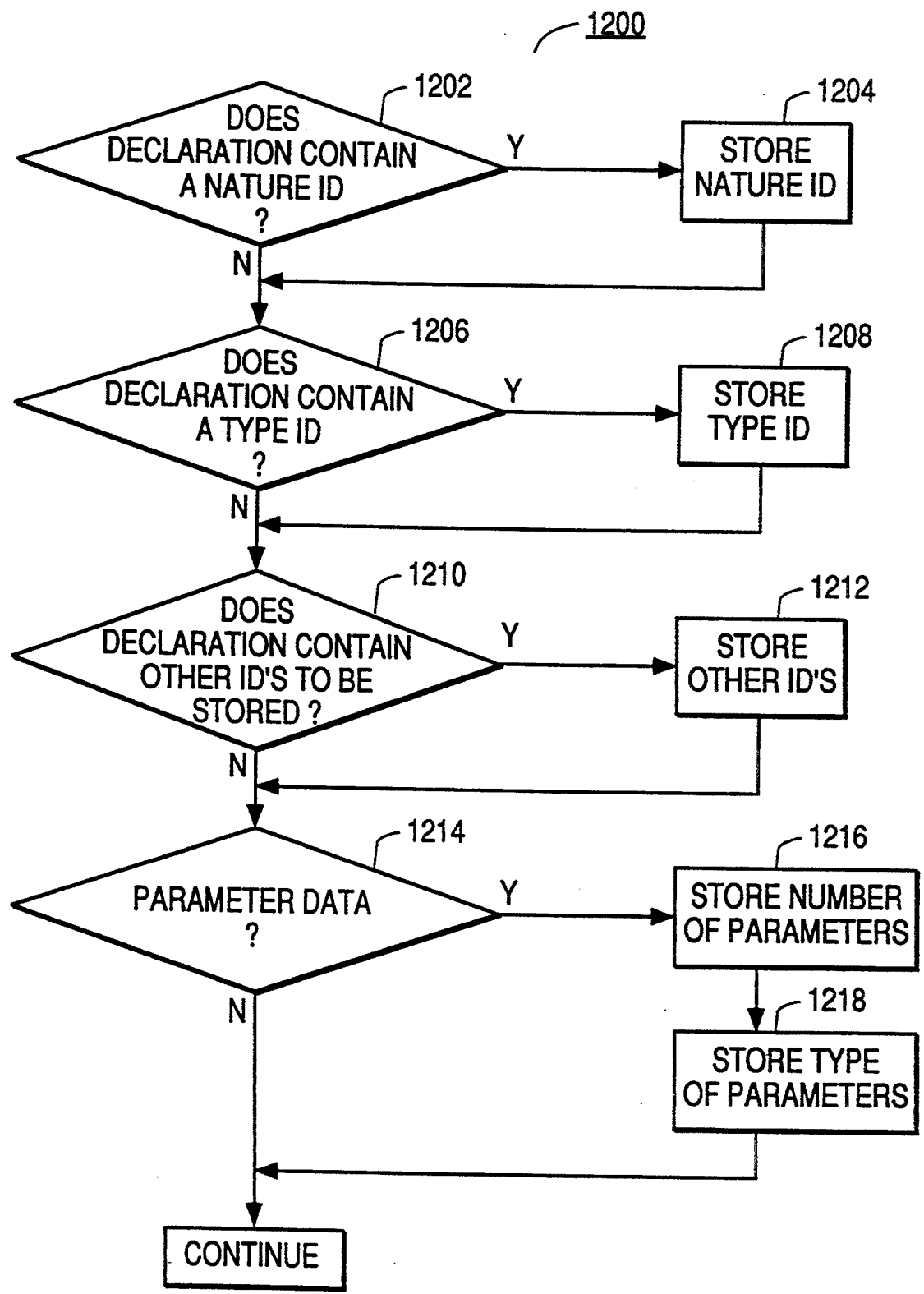
FIG. 12 is a flowchart showing further details of the flow chart of FIG. 7 for creating semantic information in the Global Context Table.

FIG. 12 is a flowchart showing further details of the flow chart of FIG. 7 for creating semantic information in the Global Context Table. The steps of FIGS. 12 and 13 have been simplified somewhat for purposes of example. Steps 1202, 1206, 1210 and 1214 check the declaration for the presence of various items of semantic information. Step 1202 is a check to determine whether the declaration contains a nature identifier. Similarly, steps 1206, 1210 and 1214 check the declaration in the source module for a type identifier, for other identifiers, and for parameter data, respectively. Steps 1204, 1208, 1212, 1216 and 1218 are used for storing the various items of information in the Global Context Table when they are detected by the checking steps just described. When a nature identifier is detected in step 1202, it is stored in step 1204. In the same manner, when a type identifier is detected in step 1206, it is stored in step 1208. When other identifiers are detected in step 1210, they are stored in step 1212. Finally, when parameter data is detected in step 1214, steps 1216 and 1218 store the number of parameters and the type of parameters, respectively.

The storage area for each of steps 1204, 1208, 1212, 1216 and 1218 is a semantic information entry in Global Context Table 606, as shown in FIG. 6.

Figure 13:
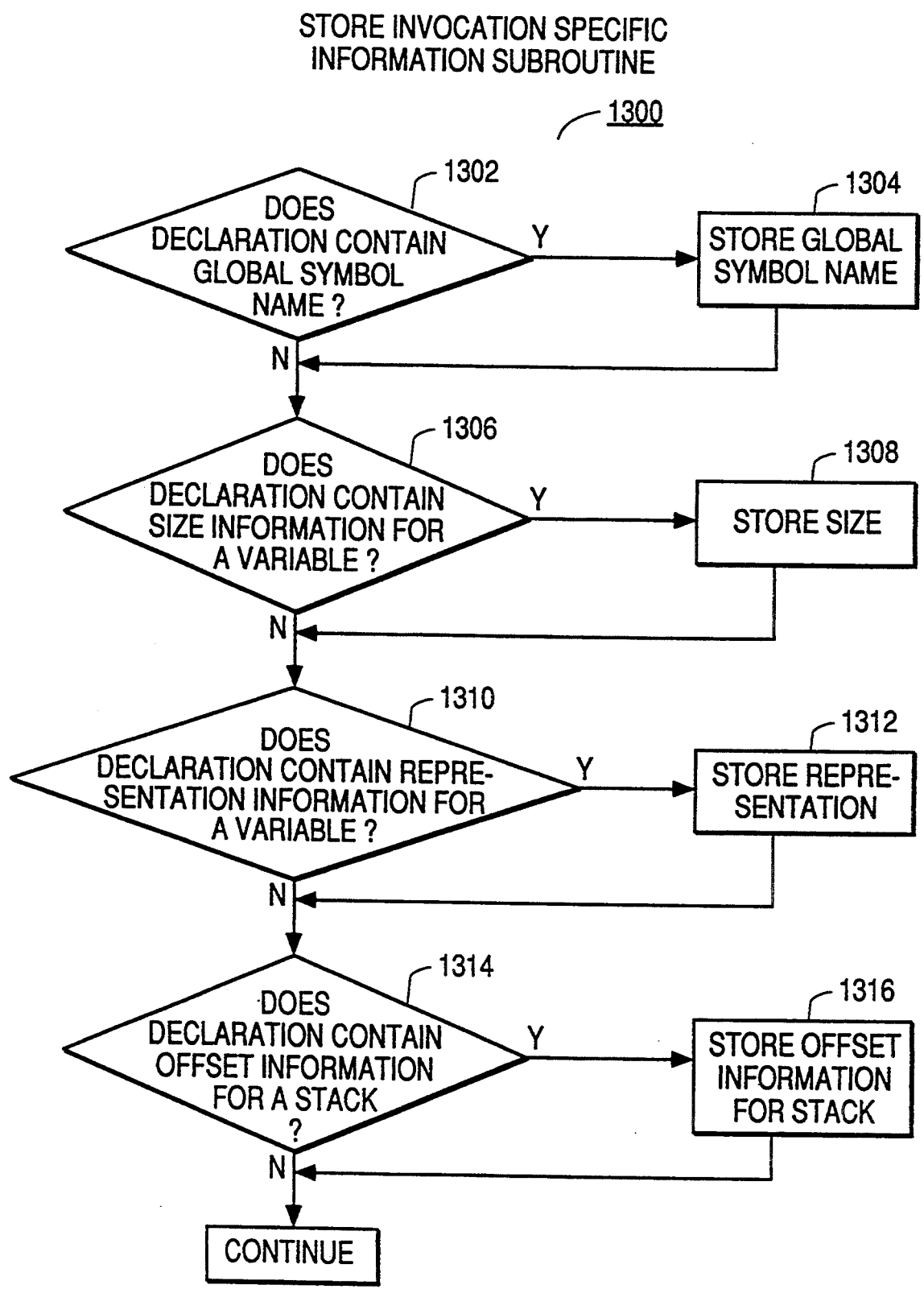
FIG. 13 is a flowchart showing further details of the flow chart of FIG. 7 for creating invocation specific information in the Global Context Table.

FIG. 13 is a flowchart showing further details of the flowchart of FIG. 7 for creating invocation specific information in Global Context Table 606. Steps 1302, 1306, 1310 and 1314 are used to check the declaration for the presence of various items of invocation specific information. Step 1302 is a check to determine whether the declaration contains a global symbol name. Similarly, steps 1306, 1310 and 1314 check the declaration for the size information of a variable, for the representation information of a variable, and for the offset information for a stack, respectively.

Steps 1304, 1308, 1312 and 1316 store the various items of invocation specific information in the Global Context Table. When a global symbol name is detected in step 1302, it is stored in the Global Context Table by step 1304. In the same manner, when size information for a variable is detected in step 1306, it is stored by step 1308. When representation information for a variable is detected in step 1310, it is stored by step 1312. Finally, when offset information for a stack is detected in step 1314, it is stored by step 1316.

The storage area used to store information in steps 1304, 1308, 1312 and 1316 is a invocation specific entry in a global context table.

FIG. 14(a) shows an exemplary source program 1402 written in the Ada programming language. As discussed above, source program 1402 includes an example of "overloaded" variable P, which is used as the name of two procedures having different types of parameters. FIGS. 15 and 16 below are examples, respectively, of the Global Context Table 606 and the Fragment Table 602 that are generated by processor 20 executing compiler 660 for source program 1402.

Figure 15A:
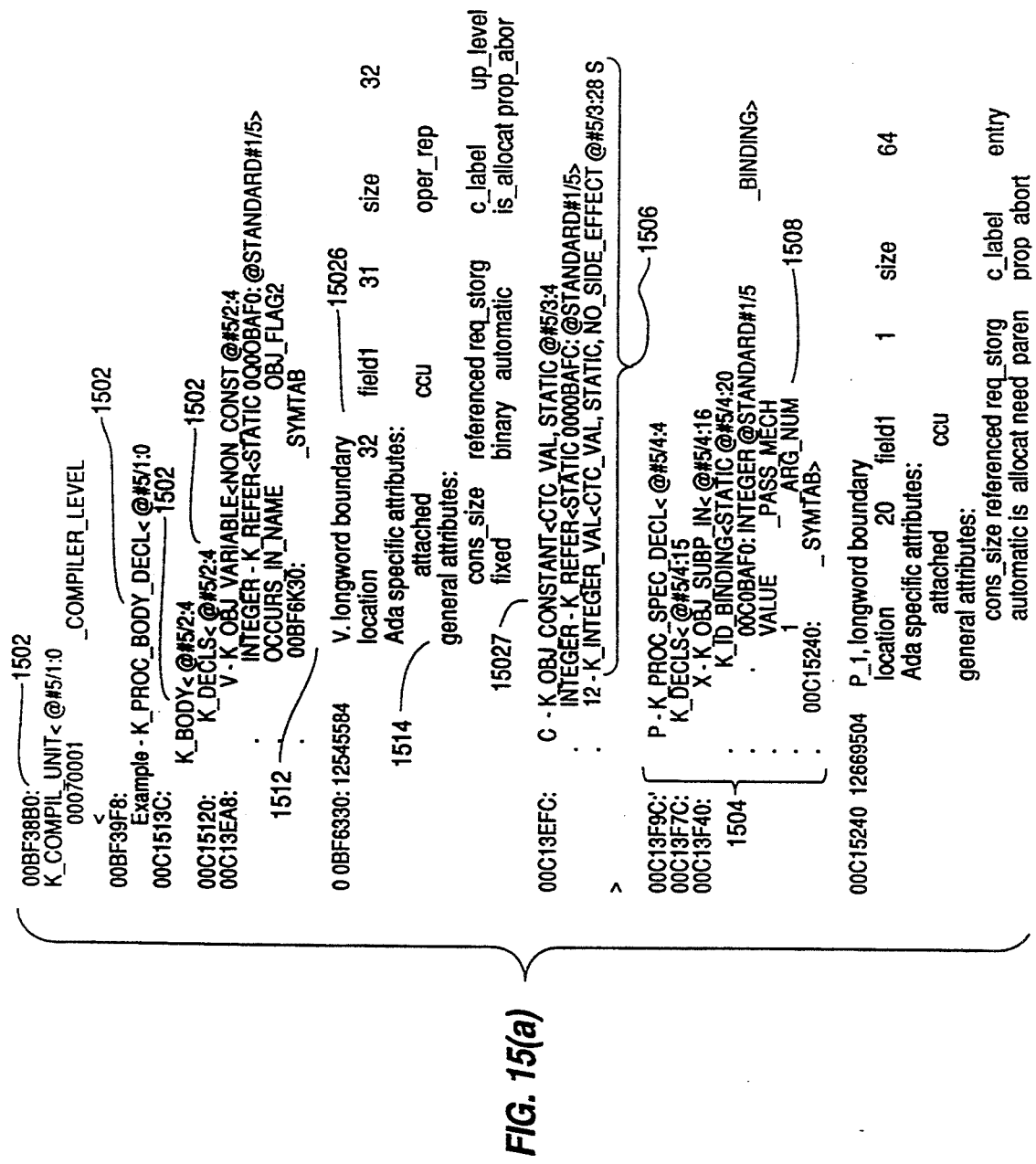
FIG. 15(a) is an example of a Global Context Table generated from the source program of FIG. 14(a)

FIGS. 15(a) and 15(b) are examples of a Global Context Table generated from the source program of FIG. 14(a). FIG. 16 is an example of a fragment table for indicating the fragments of Global Context Table of FIGS. 15(a) and 15(b). The tree structures of FIGS. 15 and 16 are shown by the indentation of the text in FIG. 15 and by a number of dots in FIG. 16.

Global Context Table 1500 of FIGS. 15(a) and 15(b) contains both semantic and invocation specific information, which can be intermixed throughout Global Context Table 1500. Integer value 1506, procedural specification declaration 1504, argument number 1508, and general attributes 1510 are examples of semantic information in Global Context Table 1500. Examples of invocation specific information in Global Context Table 1500 include an object variable definition 1512, a general attributes definition 1514 for the object variable definition 1512, and a pass mechanism 1516.

FIG. 16, indicating the fragments of the Global Context Table of FIGS. 15(a) and 15(b), shows fragment pointers 1602 as they are stored in Fragment Table 602 in compilation library 680. FIG. 16 shows 23 fragment pointers 1602. Each fragment pointer 1602 refers to an entry of Global Context Table 602. For example, pointer 1610, which has a value of "8 ... 10", indicates that the fragment table entry containing the pointer 1610 corresponds to entries 1504, which are entries number 8–10 of Global Context Table 1500 of FIG. 15. Thus, when Global Context Table 1500 was fragmented, entries 8 through 10 were placed in a single fragment.

Each of the fragment pointers 1602 has a 16-digit hexadecimal version id 1604. In FIG. 16, all of the fragment pointers 1602 have the same version id: E311E2C3 0095C46C.

Each of the fragment pointers 1602 has a description 1606. For example, the description 1606 for a first fragment pointer 1602 is "compilation unit Example at line 1", and the description 1606 for a last fragment pointer 1602 is "constant $CODE at line 0".

The descriptions 1606 correspond to fragments 1502, as indicated in FIGS. 15(a) and 15(b), which show a detailed dump of Global Context Table 602. Generally, a fragment may be defined as one or more of the individual items in the Global Context Table of FIGS. 15(a) and 15(b), including a subroutine, an object variable definition, a constant definition or a source pointer, among other things. Fragment 15026 of FIG. 15(a), for example, is an object variable definition corresponding to fragment pointer 16066 in FIG. 16. Fragment 15027 is a constant definition corresponding to fragment pointer 16067, and fragment 15021 is a subroutine "in" corresponding to fragment pointer 16021.

The following paragraphs describe a method of the present invention for ensuring that invocation specific information changes as little as possible for different invocations of the compiler.

Figure 17:
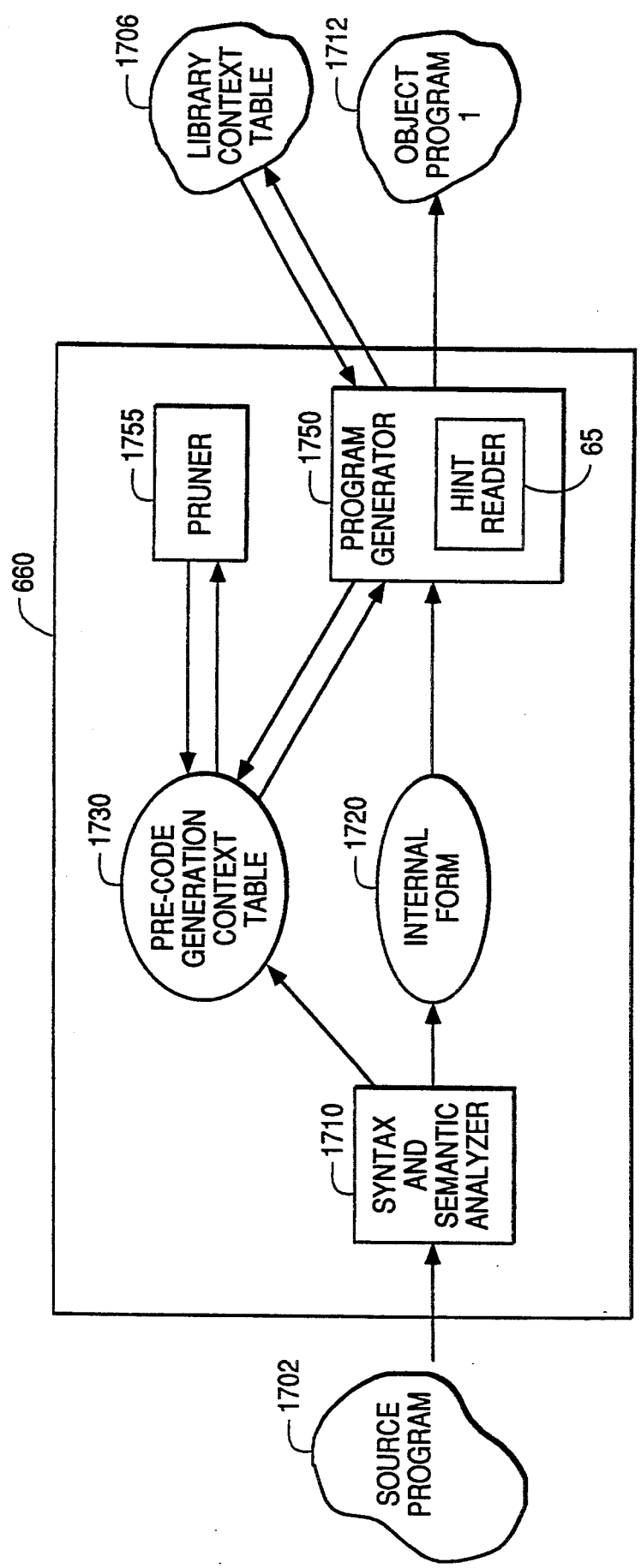
FIG. 17 is a data flow diagram of the compiler of a preferred embodiment of the present invention.

FIG. 17 shows a data flow inside of compiler 660 of FIG. 6 of a preferred embodiment of the present invention. Source program 202 is processed by syntax and semantic analyzer 1710, which generates an internal form of source program 1720 and a pre-code-generation context table, organized as pre-code-generation fragments and stored in internal context table 1730. The fragments are produced by a fragmenter program inside of syntax and semantic analyzer 1710.

In a preferred embodiment of the invention, compiler 660 associates some identifiers to a compiler generated program section name and an offset relative to the beginning of the named program section. Other modules referencing structures defined in source program 202 reference the structures using a name of a section of object code in which the external structure is resident, in combination with an offset within the section.

Figure 18:
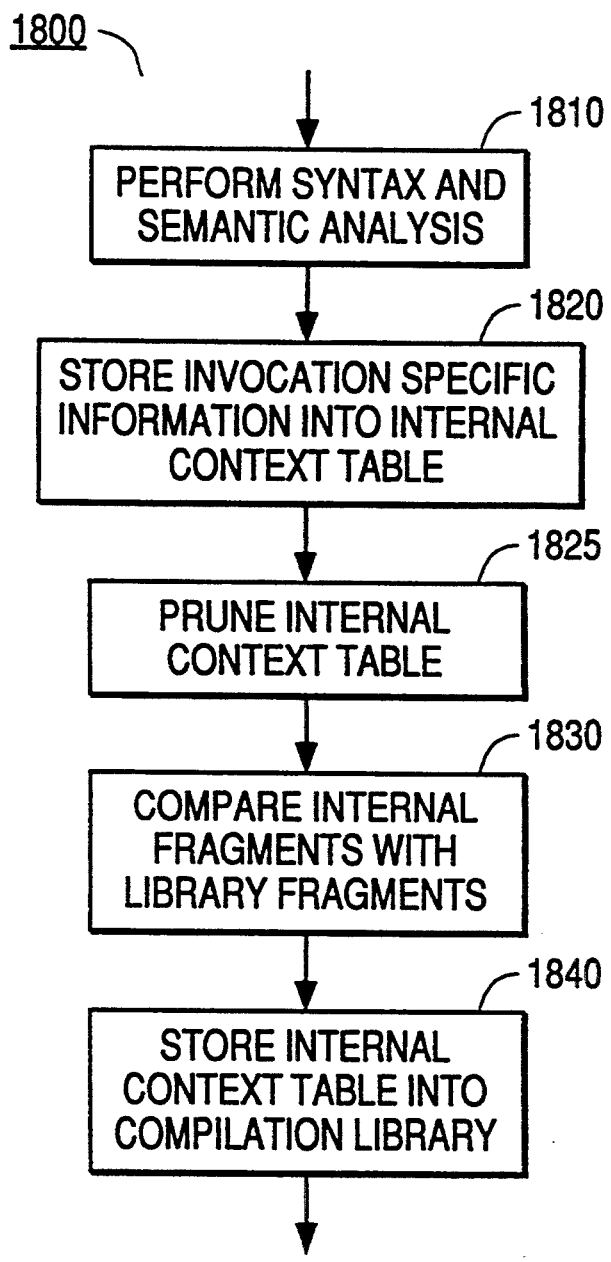
FIG. 18 is a flow chart showing a processing of a preferred embodiment of the present invention.

FIG. 18 shows a processing of a preferred embodiment of the present invention. These steps are performed by a processor executing a compiler program. Syntax and semantic analyzer 1710 processes source program 202 to a pre-code-generation context table 1730 and internal form 1720 of the source program. (Step 1810) Program generator 1750 stores invocation specific information into pre-code-generation context table 1730, using information from a part of compilation library 680 that will be superseded at the culmination of the compilation of source program 202. (Step 1820)

After code generation, pruner 1755 deletes, or "prunes", certain information from internal context table 1730 and program generator 1750 refragments pre-code-generation context table 1730. The information deleted includes information local to source program 202, which is not going to be accessed by another compilation unit. For example, in the case of a global identifier with a compile time initial expression, compiler 660 may generate a fragment for the identifier, including information for the initial expression. Subsequently, pruner 1755 will delete the initial expression from the fragment because no other compilation unit needs to access the initial expression. Thus, the fragment for the variable that is written to the library will not have the initial expression, while the pre-code-generation fragment for the variable will have the initial expression.

Fragments in pre-code-generation context table 1730 (internal fragments) are compared with fragments in the corresponding Global Context Table in the compilation library (library fragments). (Step 1830) Step 1830 is performed to determine which other source programs must be recompiled as the result of the compilation of source program 202. The corresponding entry in the compilation library is superseded by writing the internal context table to the compilation library. (Step 1840)

Figure 19:
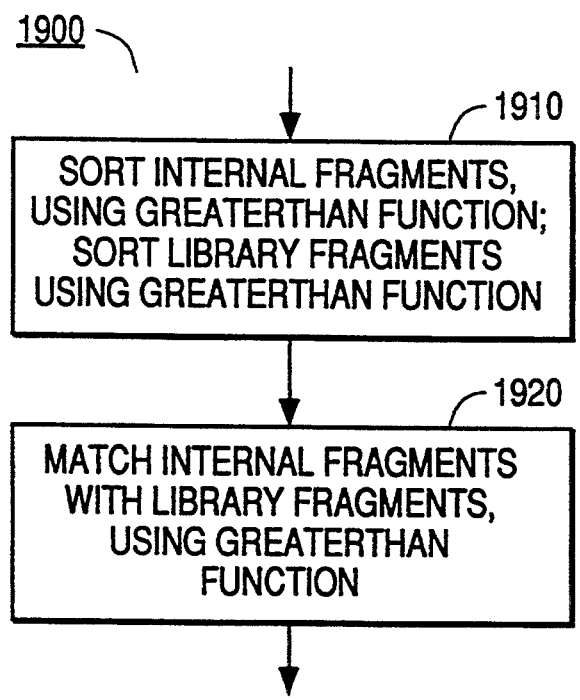
FIG. 19 is a flow chart illustrating a step of FIG. 18.

FIG. 19 shows a processing of step 1830 of FIG. 18 in more detail. In this processing the fragments of the pre-code-generation context table 1730 are sorted using a GREATERTHAN function, which compares various parts of a pair of fragments in a descending hierarchical order. For the purposes of the GREATERTHAN function, it does not matter which part of a fragment is the highest order, provided that a consistent rule is applied. For example, the fragments general categorization may be the highest order part, followed by any source program identifier for the fragments. For efficiency, a value hierarchy should be chosen so that mismatches are generated early, because the comparison is optimized when the portions of fragments most likely to be different are compared first.

TABLE 1

| | |
|---|---|
| 010 | Function GREATERTHAN (F1, F2: Fragment) return Boolean is begin |
| 020 | if F1. Nature /= F2. Nature then |
| 030 | return F1. Nature > F2. Nature; |
| 040 | else |
| 050 | case F1. Nature is |
| 060 | when Subprogram => |
| 070 | if F1. Identifier /= F2. Identifier then |
| 080 | return F1. Identifier > F2. Identifier; |
| 090 | end if; |
| 100 | if F1. Number_of_Params /= F2. Number_of_Params then |
| 110 | return F1. number_of_Params > F2. Number_of_Params; |
| 120 | end if; |
| 130 | for Each Param loop |
| 140 | if GREATERTHAN (P1, P2) then return True; end if; |
| 150 | if GREATERTHAN (P2, P1) then return False; end if; |
| 160 | end loop; |
| 170 | when Param/Object/Constant => |
| 180 | when Type/Subtype |
| 190 | end if; end case; |

TABLE 1

Table 1 shows part of a preferred GREATERTHAN function. The GREATERTHAN function compares various fields of a pair of fragments in the Global Context Table. The comparison is performed in a descending hierarchical order. In this example, the highest order field is the semantic nature of the fragment, which is processed on lines 020–030. If the semantic natures of the two fragments are different, one of the fragments will be greater than the other, as suggested on lines 020–030.

When the natures of the two fragments are both Subprogram, for example, the next field compared is an identifier for the Subprogram as shown on lines 070–080. In the case where the identifiers for the Subprogram happen to be the same, as is possible in languages that allow overloading, the fragment with the greater number of Subprogram parameters is determined to be the greater fragment, as shown on lines 100–110. In the case where the two Subprogram fragments have the same number of parameters, the fragments for the parameters themselves are compared using recursive calls to the GREATERTHAN function.

Similar to the case where the natures of both fragments are Subprogram, when the natures of the two fragments are both Param, object, or constant, the GREATERTHAN function could contain code to compare the respective identifier, mode, and type in a descending hierarchical order. In general, the GREATERTHAN function can have a separate hierarchy of field comparisons depending on the nature of the fragment, although some natures may have a common hierarchy of field comparisons.

Fragments in the pre-code-generation context table are sorted using the GREATERTHAN function. (Step 1910) The sorting is performed by first sorting all fragments at a first level in the tree of fragments discussed previously in connection with FIG. 8b. Next, the next deepest level of the tree is sorted by separately sorting the fragments within each fragment of the first level fragments. Fragments from the corresponding table in the compilation library are sorted in a similar manner. After sorting is performed, the fragments in each scope and level of the internal context table are matched with corresponding fragments of the corresponding context table from the compilation library. (Step 1920)

Figure 20:
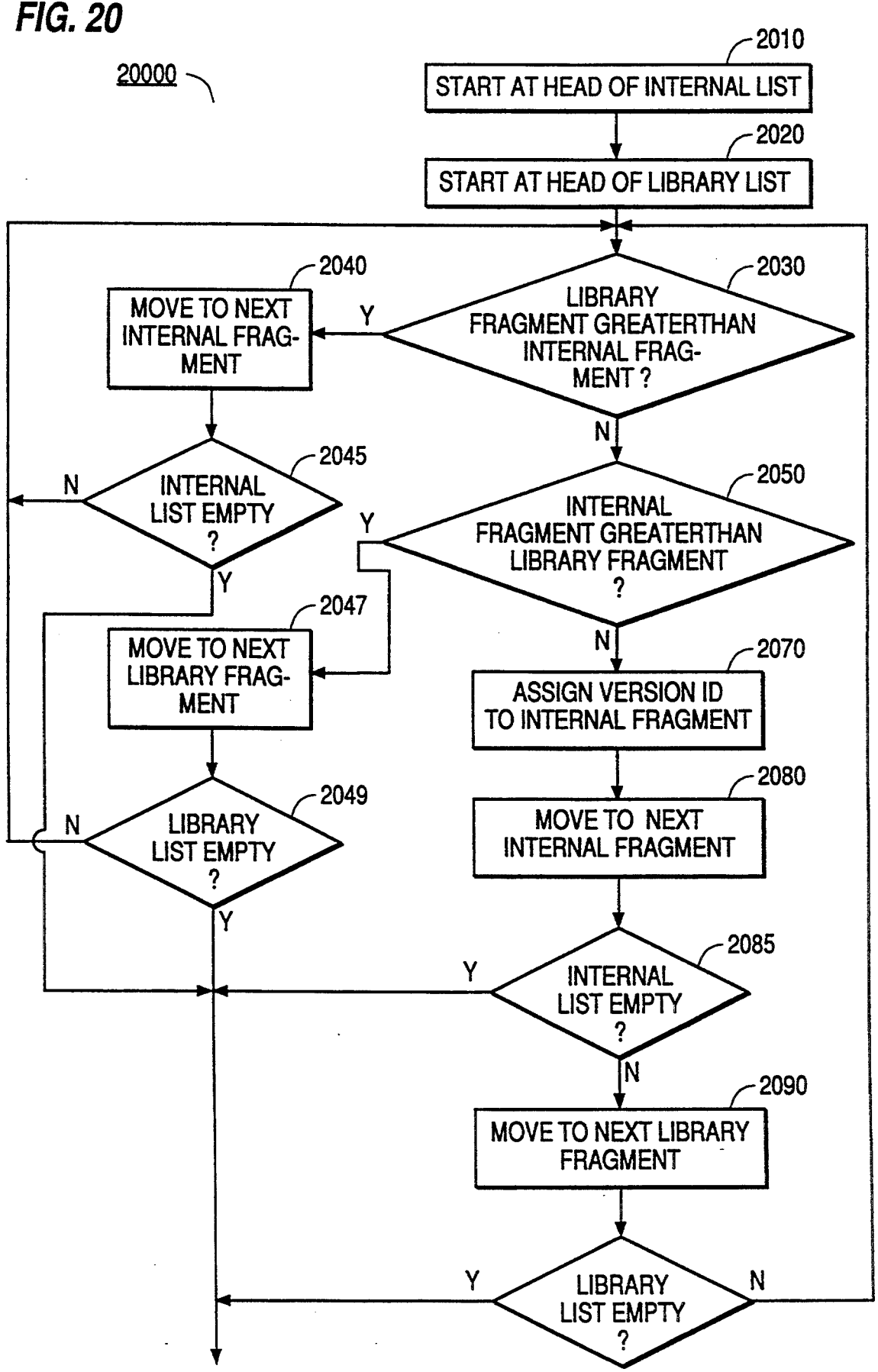
FIG. 20 is a flow chart illustrating a step of FIG. 19.

FIG. 20 shows a processing of step 1920 of FIG. 19 in more detail. It should be understood that in some embodiments, it is also necessary to sort the library fragments if they are not already sorted. In FIG. 20, an internal fragment list pointer is set to the head of the list of sorted internal fragments (internal fragments) (step 2010), and a library fragment list pointer is set to the head of the list of fragments in the corresponding library context table (library fragments) (step 2020) If the current entry in the library fragment list is GREATERTHAN the current entry in the internal library list (step 2030), the internal fragment list pointer is moved to the next entry in the internal fragment list (step 2040) and processing proceeds to step 2030. If the current library is not GREATERTHAN the internal fragment (step 2030), it is determined whether the current internal fragment is GREATERTHAN the current library fragment (2050). If the current internal fragment is GREATERTHAN the current library fragment, the library fragment list pointer is moved to the next entry in the library fragment list and control proceeds to step 2030. If neither current fragment is GREATERTHAN the other, the current fragments are considered to be a match (step 2070). Next, the internal fragment list pointer is moved to the next entry (step 2080), and it is determined whether fragments remain in the internal fragment list (step 2085). Similarly, the library fragment list pointer is moved to the next entry (step 2090) and it is determined whether entries remain in the library fragment list (step 2095). If an entry remains in both the internal fragment list and the library fragment list, control proceeds to step 2030.

Although a preferred embodiment of the present invention processes both a sorted internal fragment list and a sorted library fragment list, the invention may be practiced by sorting only one of these two lists, sequentially selecting a fragment in the unsorted list, and performing a binary search of the selected fragment in the sorted list.

Figure 21:
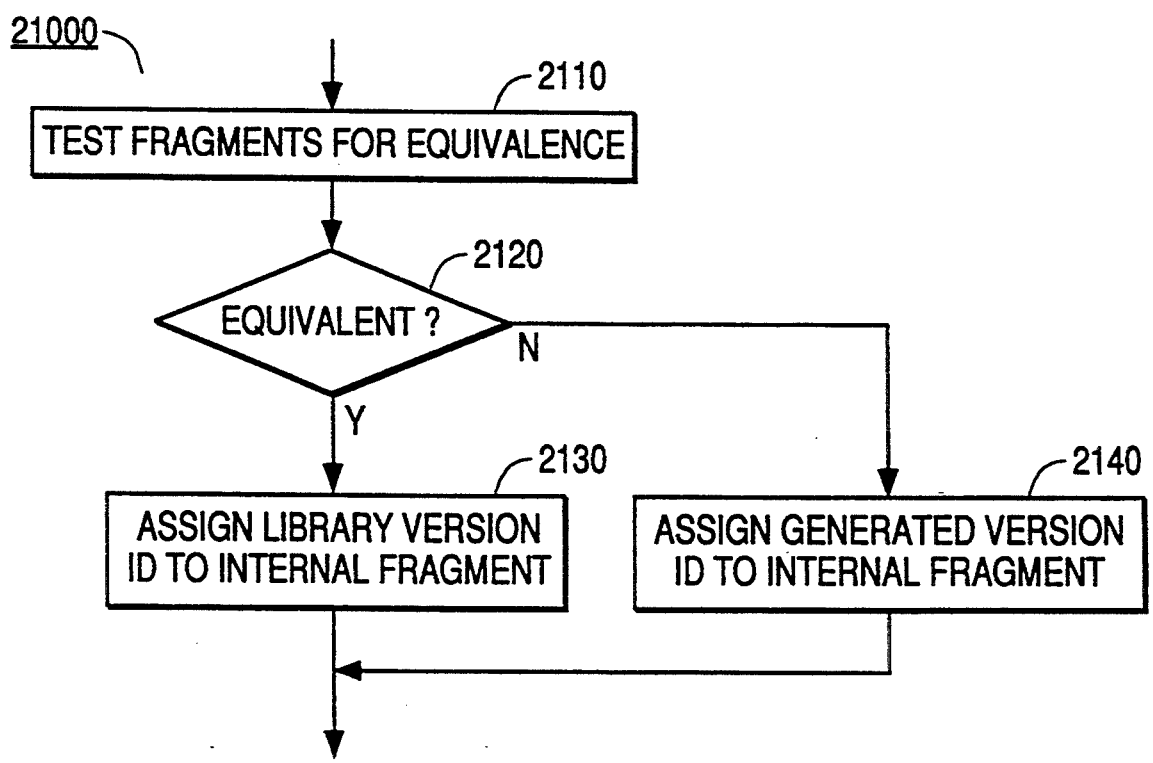
FIG. 21 is a flow chart illustrating a step of FIG. 20.

FIG. 21 shows a processing of step 2070 of FIG. 20 in more detail. Invocation specific information of the matching fragments is compared to determine if the fragments are equivalent. (Step 2110) In step 2130, certain global context table entries are considered to be invocation specific. For example, offsets within a program section are invocation specific.

If the two fragments are found to be equivalent (step 2120) the version identifer of the library fragment is stored into the internal fragment (step 2130). Otherwise, a newly generated version identifier is stored into the internal fragment (step 2140).

In the code generation of step 1820 of FIG. 18, hint reader 65 in program generator 1750 reads "hints" from Global Context Table 606 to attempt to generate a new context table 1730 that is equivalent with the Global Context Table 606, compatible in the sense that other source programs that depend on the precompilation contents of Global Context Table 606 may use the post-compilation contents of Global Context Table 606 without recompiling. Object program generator 1750 matches fragments in the pre-code-generation context table to fragments from the compilation library. Pre-code-generation fragments are processed with the library fragments using a method similar to the method the version identifier processing employs to process the post-code-generation fragments with the library fragments. The test for equivalence between the pre-code-generation fragments and the library fragments and the library fragments is not performed, however. Further, the sorting step may use fewer fields than in the version identifier processing discussed above, to accommodate changes that are made to a fragment during the code generation phase of compiler 660. Similarly, the fragment matchup may be more lenient than the matchup performed for the version identifier processing.

More specifically, the pre-code-generation fragments are matched with the library fragments using the double sorting approach of the version identifier processing discussed previously in this application. A modified greater than function, called MGREATERTHAN is employed to sort the pre-code-generation fragments, and to sort library fragments. The MGREATERTHAN function may compare fewer fields than the GREATERTHAN function described previously in connection with the version identifier processing.

Figure 22:
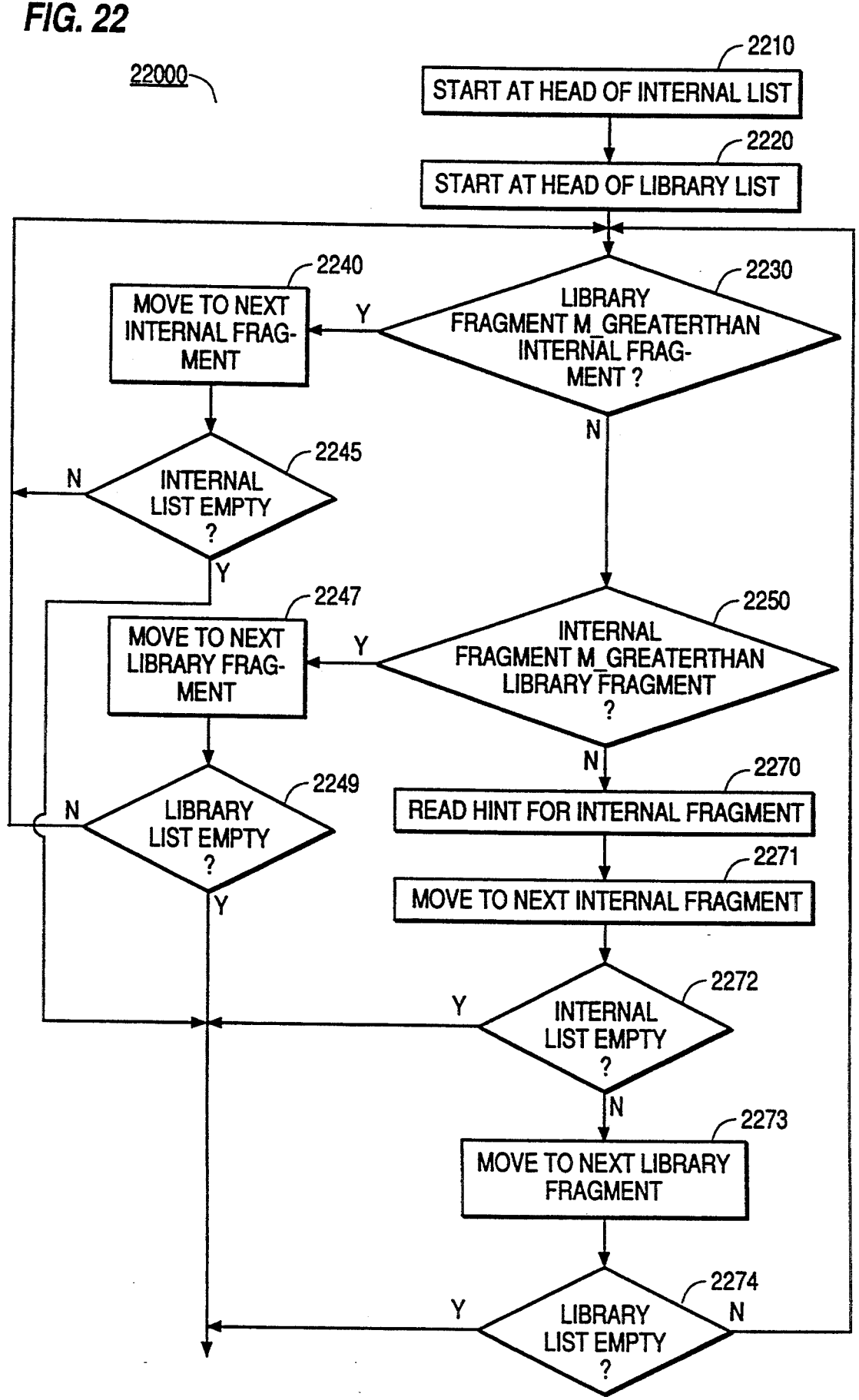
FIG. 22 is a flow chart illustrating a step of FIG. 18.

After sorting using the MGREATERTHAN function, the fragments in each scope and level of the internal context table are matched using the MGREATERTHAN function, with corresponding library fragments of the corresponding context table in the compilation library. FIG. 22 shows a processing of step 1820 of FIG. 18, including matching using the MGREATERTHAN function, in more detail. The processing of FIG. 22 is similar to the processing of FIG. 20, except that the MGREATERTHAN function is used instead of the GREATERTHAN function, and that step 2270 in FIG. 22 reads a hint for the matching internal fragment instead of assigning a version identifier to the matching internal fragment. In step 2270, reading a hint may include allocating, or reserving, a resource needed by the fragment. In general, after allocation is performed for matching fragments, allocation is performed for the non-matching fragments.

If the matching fragment is a variable or a procedure declaration, step 2270 may operate to preserve an intra-program-section difference. In this case, step 2270 may employ general purpose procedures for preserving memory areas on a stack using standard memory allocation techniques, such as "tiling" or bit maps, an procedures to allow for the reservation of memory starting at certain offsets. For example, in addition to a procedure for reserving an area of memory of a certain size, a procedure also exists for preserving an area memory of a certain size starting at a certain offset if possible.

Data indicating the reserved resource, such as a frame offset, may be stored directly in the pre-code-generation fragment or instead may be stored in a table.

Figure 23A:
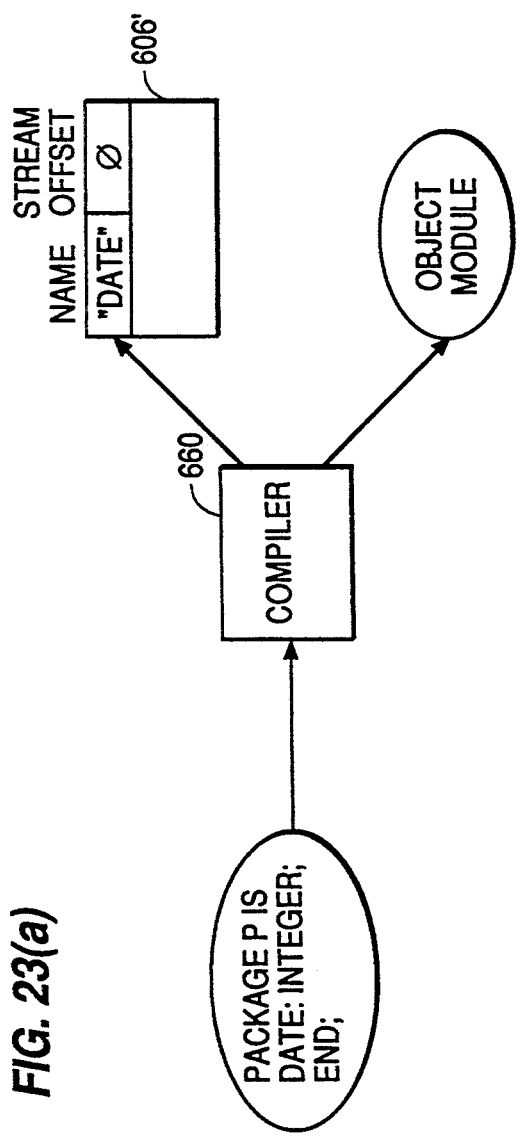
FIG. 23(a) and 23(b) are data flow diagrams showing a result of processing of a preferred embodiments of the present invention.
Figure 23B:
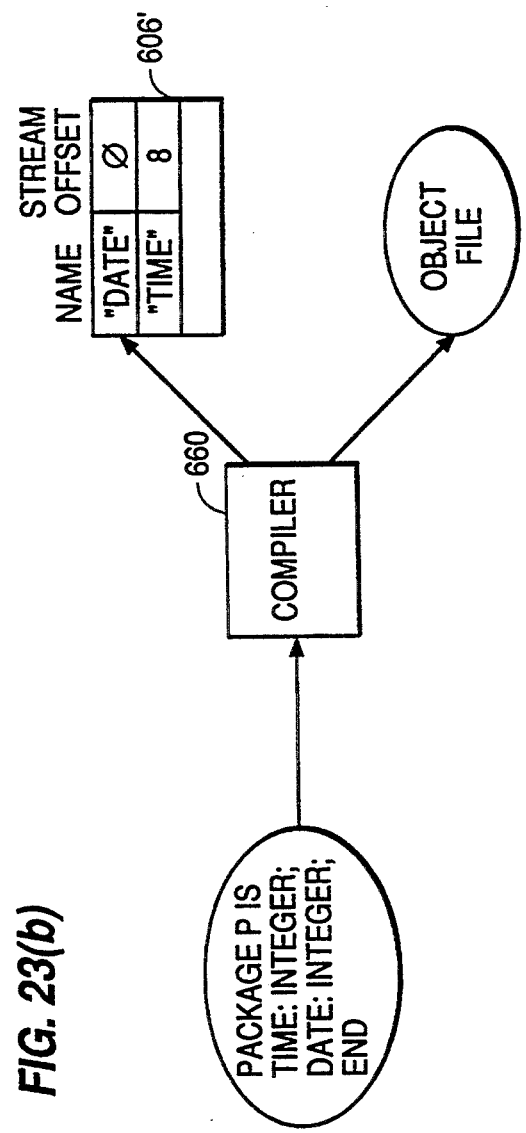

In the case where the matching fragment is a variable, FIGS. 23(a) and 23(b) show a result of processing of a preferred embodiment of the present invention. In FIG. 23(a), a program includes an identifier called "date". A first compilation generates invocation specific information including an intra-program-section offset of 0 for "date" in context table 606', which is a simple abstraction of the context table discussed in connection with FIG. 15. FIG. 23(b) shows the result of a second compilation of package P after a variable "time" has been added to the package. The second compilation preserves the intra-program-section offset of 0 for "date". Thus, other programs that were previously compiled and linked with the results of the first compilation of package P need not be recompiled.

Figure 24A:
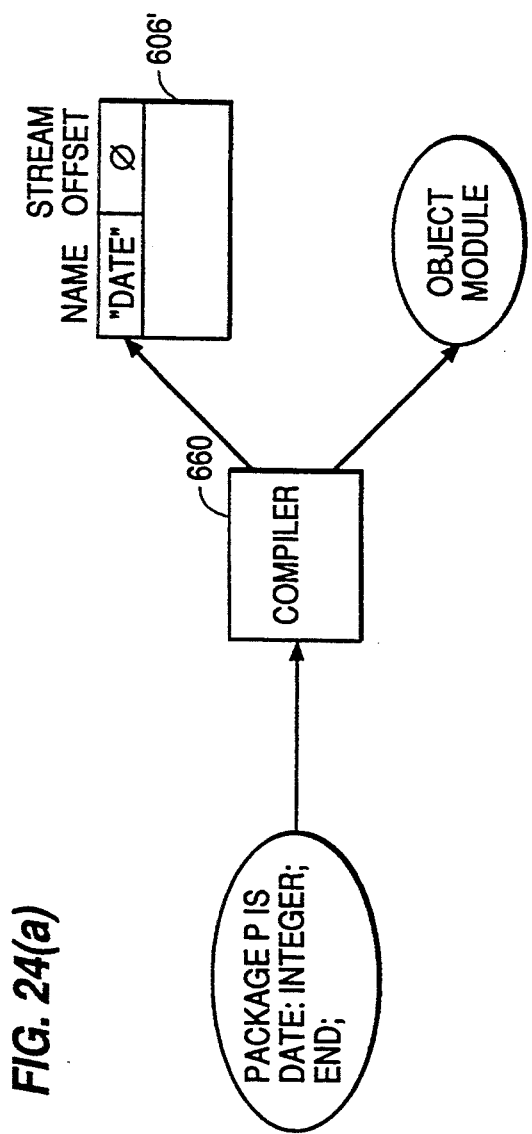
FIG. 24(a) and 24(b) are data flow diagrams showing a result of processing without the present invention.
Figure 24B:
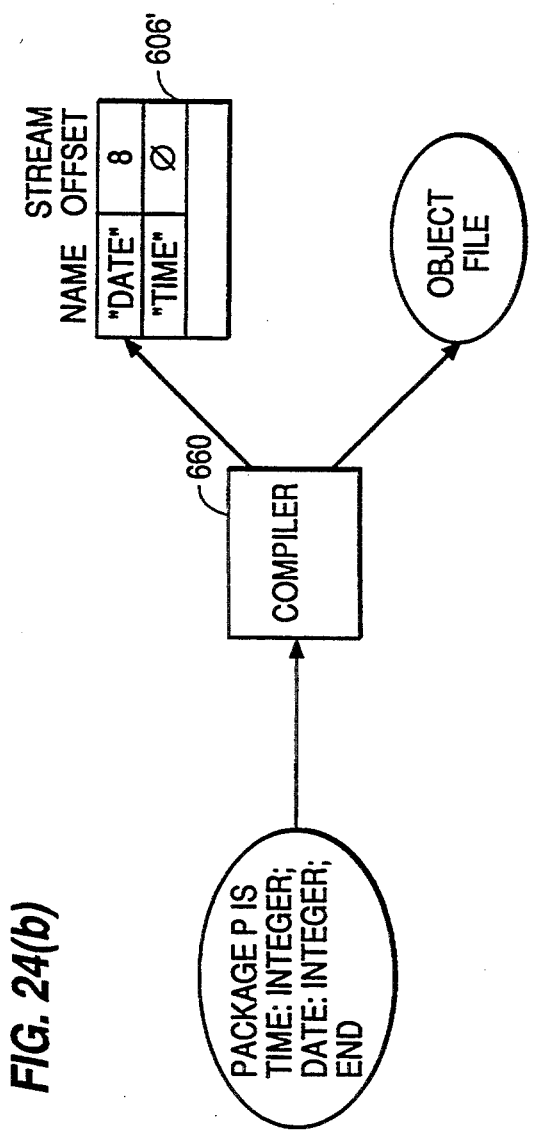

In contrast, FIG. 24(a) and 24(b) show a result of processing without the benefits of this preferred embodiment of the present invention. A first compilation generates invocation specific information including an intra-program-section offset of 0 for "date", as described in connection with FIG. 23(a). FIG. 24(b) shows the result of a second compilation after package p has been edited to add a variable "time". The results of the second compilation includes an intra-program-section offset of 8 for "date", which is different from a program section offset in the first compilation result. Consequently, other modules that reference "date" must be recompiled to reference the correct offset within the program section containing a memory area for the variable "date".

In a preferred embodiment of the present invention, there are two types of invocation specific information for procedure declarations: an intra-section offset and a program section name. When processing causes the compiler to put multiple globally defined procedures within one program section name, an attempt is made to preserve intra-section procedure offsets to produce a result similar to the result described in connection with FIG. 23.

Figure 25:
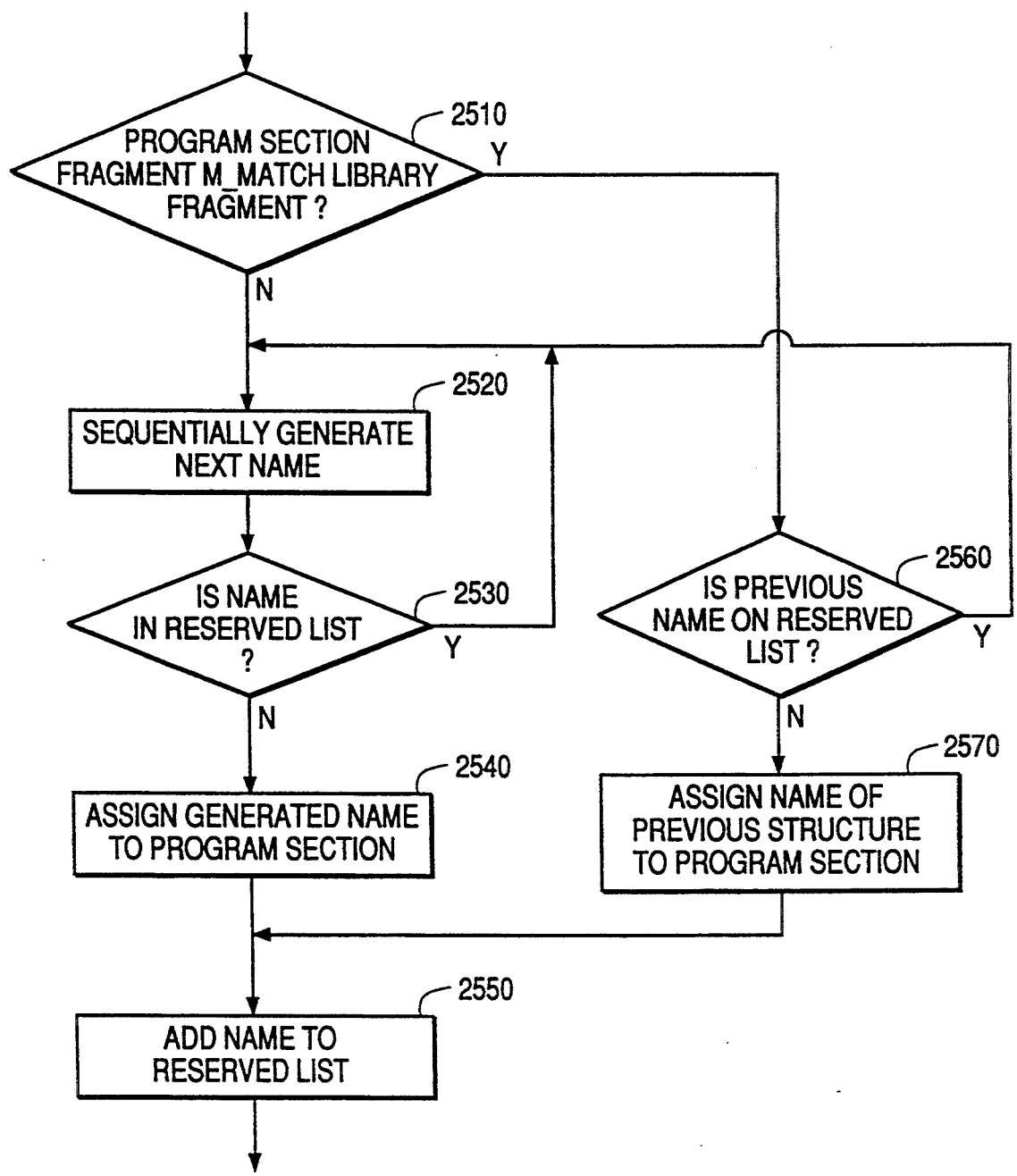
FIG. 25 is a flow chart of a processing of a preferred embodiment of the present invention.

FIG. 25 shows an overview of program section name processing of a preferred embodiment of the present invention. First, it is determined whether a program section pre-code-generation fragment tentatively matches a library fragment. Step 2510 corresponds to the tentative matching processing discussed above. If there is no tentative match, a name is generated for the program section based in part on sequentially generated data. (Step 2520) It is determined whether the generated name is already used by determining if the name is on a reserved list of names. (Step 2530) If the name is on the already reserved list of names processing passes to step 2520. Otherwise, the generated name is assigned to the program section (step 2540) and the name is then added to the reserved list of names. (Step 2550) If the program section prefragment does correspond to a library fragment, it is determined whether the program section name of the library fragment is on the reserved list of names. (Step 2560) The processing of step 2560 may be necessary in the event that the compiler assigns sequentially generated names in processing other than the processing shown in FIG. 25. If the library name is not on the reserved list of names, the library name is assigned to the prefragment (step 2570) and the library name is added to the reserved list of names (step 2550).

In a preferred embodiment, the steps shown in FIG. 25 are not necessarily executed in temporal proximity to each other. Instead, the steps shown in FIG. 25 may be interleaved with other processing of a preferred embodiment.

Because the MGREATERTHAN function does not compare as many fields as the GREATERTHAN function described above, the match using MGREATERTHAN tends to be more lenient than the match using GREATERTHAN. Because of the lenient matching, there is a possibility that a pre-code-generation fragment might be matched with a noncorresponding library fragment. Any mismatching should not result in incorrect processing, since a mismatch should merely cause an allocation that will make the new fragment not equivalent to the old fragment in the version identifier processing discussed above.

In some implementations, the lenient matching may cause multiple pre-code-generation fragments to match to a common library fragment. If such a common match occurs, processing should ensure that multiple pre-code-generation fragments are not assigned the same resource as a result of reading a common hint from the common library fragment.

The MGREATERTHAN function is used to compare the pre-code-generation fragments to the compilation library fragments, because code generator 1750 and pruner 1755 may affect the internal context table. MGREATERTHAN does not compare certain parts of a pre-code-generation internal fragment, that are subject to change by code generator 1750 or pruner 1755, with a corresponding part of a library fragment.

Fragmenting the Global Context Table operates to segment a program into a plurality of parts. As the fragmenter generates a tree structure, the fragmenter operates to generate a graph of parts, including a part identifying a plurality of other parts.

Although in a preferred embodiment the memory structure in which replacement of a compilation result occurs is a compilation library, the memory structure in which replacement occurs need not limited to a compilation library. For example, replacement may occur in a memory structure defined by list of file specifications, such as a list of object file specifications processed by a linker to generate an executable image. In a system supporting multiple versions of files, the absence of a file name version number in a file name specification typically means the highest version of the named file. In such a system, compiling a source file to produce a new object module having a version number greater than a corresponding previous object module constitutes a replacement in the memory structure defined by the file specification list passed to the linker, since the generation of the new object module results in the previous object module not having the highest object file name version number.

Similarly, the memory structure in which replacement occurs may be a memory structure defined by the INCLUDE statements in a particular source file.

Hints preferably can pertain to the size of an area to allocate for a variable. In some cases, the hint for the size of a variable will not be followed because some change in the source program mandates a certain of a variable size. For example, occasionally there are conditions that force data to be a particular size. For example, if a data item is passed to a subroutine and the subroutine was written in a different language other than ADA, the ADA compiler might be forced to use a particular size for the data item.

Hints preferably can pertain to the size of a module. For example, if a new version of a module is smaller than the old version, it may be desirable to follow a hint to enlarge the new module so that it occupies a same amount of memory as the old module.

Hints may pertain to the registers used to pass parameters to procedures or functions.

Although a preferred embodiment tends to adopt hints early in the code generation process, an alternative approach could perform most of the code generation including the generation of a Global Context Table without reference to hints, and subsequently shuffle or adjust values of the invocation specific information in the completed Global Context Table.

Further, in embodiments that include a linker program distinct from a compiler program, as shown in FIG. 6, selective invocation of the compiler program is not necessary for practice of the invention, because selective invocation of the linker may operate to selectively translate a program in response to whether there is a substantial difference between compilation results. Although a preferred embodiment includes a linker program that is distinct from the compiler program, the invention does not require that there be any such partition of functions for the translation of a program into a machine-executable form.

In a preferred embodiment, translating a program into a machine executable program involves processing the program with a compiler, which performs syntax analysis on the program, and subsequently processing compiler output with a linker combines the program sections generated for the compilation of the various source files. The translation can be performed, however, with solely a linker or solely a compiler.

In addition to smart recompilation, hint reading could also be used, for example, with VMS shared images to preserve previous routine addresses through subsequent releases of a library. Further, in FORTRAN and C(++), hints could be used to attempt to cause the layout of common blocks, structures, etc. to be the same across multiple object files.

In general, the hint reading principles of a preferred embodiment may also be used to minimize relinking caused by changes in transfer vectors among shared images, or to minimize relinking caused by changes in debugging information among respective modules of the system.

In a chip design/layout, or other CAD/CAM system, hint reading can be applied to minimize rebuilding when a component is revised. User input to a CAD/CAM system may be topological layout information, a register transfer language, a series of menu commands, or some other convenient form. The user input corresponds to a program, and certain data generated by the CAD/CAM system, such as a specific chip layout location or geometry, corresponds to a translation result.

It is intended that the specification and examples be considered as exemplary only, with a true scope of the invention being indicated by the following claims. Various modifications and variations can be made to the present invention without departing from the scope or spirit of the invention, and it is intended that the present invention cover the modifications and variations provided they come within the scope of the appended claims and their equivalents.

What is claimed is:

1. In a computer system including a memory, a method of compiling source programs, the method comprising the steps of:

compiling a first program to produce a first compiled program and a first set of post-code generation information characterizing the first compiled program;

compiling a second program to produce a second compiled program using the first set of postcode generation information to minimize differences between the first and second compiled program;

determining differences between the first and second compiled programs; and compiling a third program dependent upon the differences between the first and second compiled programs.

2. The method of claim 1, wherein the step of compiling the first program includes segmenting the first compiled program into a plurality of first parts; and wherein the first set of post-code generation information which characterizes the first compiled program includes post-code generation information which characterize the plurality of first parts.

3. The method of claim 1, wherein said first set of post-code generation information includes a hint corresponding to an offset from a beginning of a data area in the first compiled program.

4. The method of claim 1, wherein said first set of post-code generation information includes a hint corresponding to a size of a data area in the first compiled program.

5. The method of claim 2, wherein said first set of post-code generation information includes a hint identifying one of the plurality of first parts.

6. The method of claim 2, wherein said first set of post-code generation information includes a hint comprising an alphanumeric name identifying one of the plurality of first parts.

7. The method of claim 1, wherein the step of compiling the second program includes segmenting the second compiled program into a plurality of second parts;

producing post-code generation information characterizing the plurality of second parts using the first set of post-code generation information; and wherein the determining step further includes comparing corresponding parts from the first and second plurality of parts to determine differences between the first and second compiled programs.

8. The method of claim 1, wherein the first and second compiled programs are first and second object files, respectively, and wherein the method further includes linking the first and second object files to produce the machine executable program.

9. The method of claim 1, wherein the first and second compiled programs each include program sections, each program section having a section name and a portion of allocated memory and wherein said post code-generation information includes a hint pertaining to a physical memory reference represented by a section address comprising a section name, and an offset.

10. The method of claim 1, wherein said post-code generation information includes a hint pertaining to a register and a corresponding register offset used as an address for a compiler temporary variable.

11. The method of claim 1, wherein said post-code generation information includes a hint pertaining to data and code alignment requirements.

12. The method of claim 1, wherein said post-code generation information includes a hint pertaining to registers used in passing parameters in an outbound procedure call.

13. The method of claim 1, wherein said post-code generation information includes a hint pertaining to size allocation of a variable.

14. The method of claim 1, wherein said post-code generation information includes a hint pertaining to code and data allocation of a module.

15. The method of claim 1, wherein said post-code generation information includes a hint pertaining a register and a corresponding register offset representing the address of a routine in the first and second compiled programs, respectively.

16. The method of claim 1 further comprising the step of storing the first set of post-code generation information in the memory, and replacing post-code generation information from the first set with corresponding post-code generation information produced from the second compilation.

17. In a computer system including a memory, a method of compiling a source program, the method comprising the steps of:

compiling a first source file having a first contents to produce a first compiled program and a first set of post-code generation hints characterizing the first compiled program;

modifying the first source file to have a second contents differing from the first contents;

compiling the first source file having the second contents to produce a second compiled program using the first set of post-code generation hints to minimize differences between the first and second compiled programs;

determining whether a portion of the second compiled program is different from a corresponding portion of the first compiled program; and compiling another source file, in response to the determining step, when a portion of the second compiled program is different from a corresponding portion of the first compiled program.

* * * * *